(12) United States Patent
Nigo et al.

(10) Patent No.: US 10,483,816 B2
(45) Date of Patent: Nov. 19, 2019

(54) MOTOR, ROTOR, COMPRESSOR, AND REFRIGERATION AND AIR CONDITIONING APPARATUS

(71) Applicant: Mitsubishi Electric Corporation, Tokyo (JP)

(72) Inventors: Masahiro Nigo, Tokyo (JP); Kazuchika Tsuchida, Tokyo (JP); Ryukichi Kijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 15/756,182

(22) PCT Filed: Oct. 30, 2015

(86) PCT No.: PCT/JP2015/080803
§ 371 (c)(1),
(2) Date: Feb. 28, 2018

(87) PCT Pub. No.: WO2017/072967
PCT Pub. Date: May 4, 2017

(65) Prior Publication Data
US 2018/0248426 A1 Aug. 30, 2018

(51) Int. Cl.
*H02K 21/12* (2006.01)
*H02K 1/27* (2006.01)
(Continued)

(52) U.S. Cl.
CPC ......... *H02K 1/2766* (2013.01); *F25B 31/026* (2013.01); *H01F 1/057* (2013.01);
(Continued)

(58) Field of Classification Search
CPC .. H02K 1/276; H02K 1/2766; H02K 2213/03; H02K 1/278; H02K 1/28; H02K 1/27; H02K 1/02
See application file for complete search history.

(56) References Cited

U.S. PATENT DOCUMENTS 5,159,220 A * 10/1992 Kliman ................ H02K 1/2766
310/156.56
2007/0126304 A1 6/2007 Ito et al.
(Continued)

FOREIGN PATENT DOCUMENTS

| CN | 105009418 A | 10/2015 |
| JP | H06-070520 A | 3/1994 |

(Continued)

OTHER PUBLICATIONS

Office action dated Sep. 18, 2018 issued in corresponding JP patent application No. 2017-547329 (and English machine translation thereof).

(Continued)

*Primary Examiner* — Thanh Lam
(74) *Attorney, Agent, or Firm* — Posz Law Group, PLC

(57) ABSTRACT

A motor includes a stator, a rotor including a rotor core having a magnet insertion hole, and a plurality of permanent magnets disposed in the magnet insertion hole of the rotor core and having two permanent magnets adjacent to each other. The rotor core has a first magnet holding portion in the magnet insertion hole, and a second magnet holding portion at an end of the magnet insertion hole in a circumferential direction. The rotor core has a plurality of electromagnetic steel sheets stacked in an axial direction. Relationships A>B and A>C are satisfied, where a number of the plurality of electromagnetic steel sheets is represented by A, a number of electromagnetic steel sheets having the first magnet holding portions is represented by B, and a number of (Continued)

electromagnetic steel sheets having the second magnet holding portions is represented by C.

17 Claims, 25 Drawing Sheets

(51) Int. Cl.
- *H02K 1/22* (2006.01)
- *F25B 31/02* (2006.01)
- *H01F 1/057* (2006.01)
- *H02K 1/02* (2006.01)
- *F04C 18/34* (2006.01)

(52) U.S. Cl.
CPC ............. *H02K 1/02* (2013.01); *H02K 1/22* (2013.01); *H02K 1/27* (2013.01); *F04C 18/34* (2013.01); *F04C 2240/40* (2013.01); *H02K 2213/03* (2013.01)

(56) References Cited

U.S. PATENT DOCUMENTS

| | | | |
|---|---|---|---|
| 2009/0230803 A1 | 9/2009 | Nakayama et al. | |
| 2013/0154425 A1* | 6/2013 | Nakada | H02K 1/2766 310/156.53 |
| 2014/0000096 A1 | 1/2014 | Takemoto et al. | |
| 2014/0145538 A1 | 5/2014 | Date et al. | |
| 2015/0001981 A1* | 1/2015 | Hattori | H02K 1/2766 310/156.53 |
| 2015/0137650 A1 | 5/2015 | Takahashi | |
| 2015/0280499 A1* | 10/2015 | Pandi | H02K 1/2766 310/156.53 |
| 2015/0364959 A1 | 12/2015 | Oketani et al. | |
| 2016/0134163 A1* | 5/2016 | Hamanaka | H02K 1/2766 310/156.53 |
| 2016/0149450 A1 | 5/2016 | Horii et al. | |
| 2016/0380493 A1* | 12/2016 | Matsumoto | H02K 1/2766 310/156.21 |
| 2017/0162311 A1 | 6/2017 | Shimbo et al. | |

FOREIGN PATENT DOCUMENTS

| | | |
|---|---|---|
| JP | H09-009537 A | 1/1997 |
| JP | 3690067 B2 | 6/2005 |
| JP | 2007-159196 A | 6/2007 |
| JP | 2007-181254 A | 7/2007 |
| JP | 2009-131140 A | 6/2009 |
| JP | 2010-206882 A | 9/2010 |
| JP | 2012-210040 A | 10/2012 |
| JP | 2013-192294 A | 9/2013 |
| JP | 2014-007925 A | 1/2014 |
| JP | 2014-107913 A | 6/2014 |
| JP | 2015-097437 A | 5/2015 |
| WO | 2015/019402 A1 | 2/2015 |
| WO | 2015/147304 A1 | 10/2015 |

OTHER PUBLICATIONS

International Search Report of the International Searching Authority dated Jan. 19, 2016 for the corresponding international application No. PCT/JP2015/080803 (and English translation).
Korean Office Action dated Jan. 16, 2019 for the corresponding Korean application No. 10-2018-7005421 (English translation attached).
Japanese Office Action dated Mar. 19, 2019 for the corresponding JP application No. 2017-547329 (English translation attached).
Office Action dated Jun. 26, 2019 issued in corresponding KR patent application No. 10-2018-7005421 (and English translation).
Office Action dated Aug. 9, 2019 issued in corresponding CN Patent Application No. 201580084114.1 (and English translation).
Office Action dated Aug. 12, 2019 issued in corresponding KR Patent Application No. 10-2019-7021584 (and English translation).

* cited by examiner

MOTOR, ROTOR, COMPRESSOR, AND REFRIGERATION AND AIR CONDITIONING APPARATUS

CROSS REFERENCE TO RELATED APPLICATION

This application is a U.S. national stage application of International Patent Application No. PCT/JP2015/080803 filed on Oct. 30, 2015, the disclosure of which is incorporated herein by reference.

TECHNICAL FIELD

The present invention relates to a permanent magnet embedded type motor, a rotor of the motor, and a compressor and a refrigeration and air conditioning apparatus using the motor.

BACKGROUND ART

Conventionally, a motor in which permanent magnets are mounted on a rotor is known. This kind of motor is broadly classified as a surface magnet type motor (see, for example, patent reference 1) in which permanent magnets are attached to a surface of a rotor, or a permanent magnet embedded type motor in which permanent magnets are embedded in a rotor. In the permanent magnet embedded type motor, magnet insertion holes are formed in a rotor core, and the permanent magnets are disposed in the magnet insertion holes. A magnet holding portion (a protrusion) is provided in the magnet insertion hole for positioning the permanent magnet so as to prevent the permanent magnet from moving in the magnet insertion hole.

PATENT REFERENCE

[PATENT REFERENCE 1]: Japanese Patent Application Publication No. H6-70520 (see FIG. 2)

However, the magnet holding portion is formed of the same magnetic material as the rotor core, and thus magnetic flux from a stator tends to flow through the magnet holding portion when the motor is driven. Therefore, an end portion of the permanent magnet adjacent to the magnet holding portion tends to be demagnetized.

SUMMARY

The present invention is intended to solve the above described problem, and an object of the present invention is to suppress demagnetization of the permanent magnet.

A motor of the present invention includes a stator and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core has a first magnet holding portion between the permanent magnets adjacent to each other in the magnet insertion hole, and has a second magnet holding portion at an end of the magnet insertion hole in the circumferential direction. The rotor core has a plurality of electromagnetic steel sheets stacked in an axial direction. Relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

A rotor of the present invention includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core has a first magnet holding portion between the permanent magnets adjacent to each other in the magnet insertion hole, and has a second magnet holding portion at an end of the magnet insertion hole in the circumferential direction. The rotor core has a plurality of electromagnetic steel sheets stacked in an axial direction. Relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

A compressor of the present invention includes a motor and a compression mechanism driven by the motor. The motor includes a stator and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core has a first magnet holding portion between the permanent magnets adjacent to each other in the magnet insertion hole, and has a second magnet holding portion at an end of the magnet insertion hole in the circumferential direction. The rotor core has a plurality of electromagnetic steel sheets stacked in an axial direction. Relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

A refrigeration and air conditioning apparatus of the present invention includes a compressor, a condenser, a decompression device, and an evaporator. The compressor includes a motor and a compression mechanism driven by the motor. The motor includes a stator and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core has a first magnet holding portion between the permanent magnets adjacent to each other in the magnet insertion hole, and has a second magnet holding portion at an end of the magnet insertion hole in the circumferential direction. The rotor core is formed by stacking a plurality of electromagnetic steel sheets in an axial direction of the rotor. Relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

According to the present invention, among the plurality of electromagnetic steel sheets constituting the rotor core, the number B of electromagnetic steel sheets having the first magnet holding portions between the permanent magnets adjacent to each other in the magnet insertion holes, and the number C of electromagnetic steel sheets having the second magnet holding portions at the ends of the magnet insertion holes in the circumferential direction are both smaller than the total number A of the electromagnetic steel sheets. Therefore, demagnetization of the permanent magnets due to magnetic flux flowing from the first magnet holding portions and the second magnet holding portions to the permanent magnets can be suppressed. Moreover, with the first magnet holding portions and the second magnet holding portions provided in some of the electromagnetic steel sheets, the permanent magnets can be positioned in the magnet insertion holes.

DETAILED DESCRIPTION

First Embodiment

First, a first embodiment of the present invention will be described. The first embodiment is intended to position permanent magnets in magnet insertion holes of a rotor in a permanent magnet embedded type motor, and to suppress demagnetization of the permanent magnets.

Figure 1:
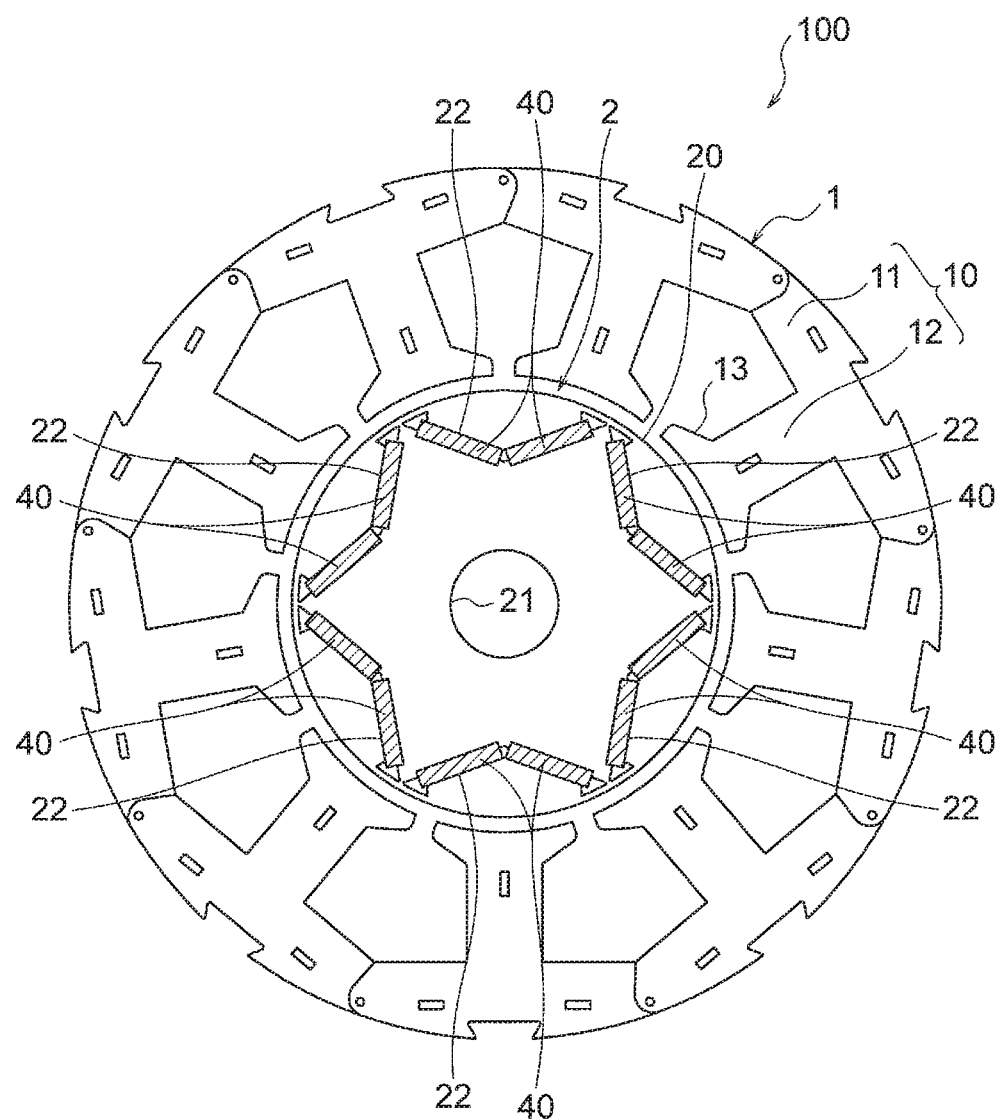
FIG. 1 is a sectional view of a motor of a first embodiment.

FIG. 1 is a sectional view illustrating a configuration of a motor 100 of the first embodiment of the present invention. This motor 100 is a permanent magnet embedded type motor having permanent magnets 40 embedded in a rotor 2, and is used in, for example, a rotary compressor 300 (refer to FIG. 8). Incidentally, FIG. 1 is a sectional view in a plane perpendicular to a rotation axis of the rotor 2.

As illustrated in FIG. 1, the motor 100 includes a stator 1 and the rotor 2 provided rotatably inside the stator 1. An air gap of, for example, 0.3 to 1 mm is formed between the stator 1 and the rotor 2.

The stator 1 includes a stator core 10 and a coil 15 (FIG. 8) wound around the stator core 10. The stator core 10 is obtained by stacking a plurality of electromagnetic steel sheets each having a thickness of 0.1 to 0.7 mm (here, 0.35 mm) in a direction of the rotation axis and fixing the electromagnetic steel sheets by caulking.

The stator core 10 includes an annular yoke section 11 and a plurality of (here, nine) teeth 12 protruding radially inward from the yoke section 11. Slots are formed between the adjacent teeth 12. Each of the teeth 12 has a tooth tip portion 13 at a radially inner end, and the tooth tip portion 13 has a wide width (a size in a circumferential direction of the stator core 10).

Figure 8:
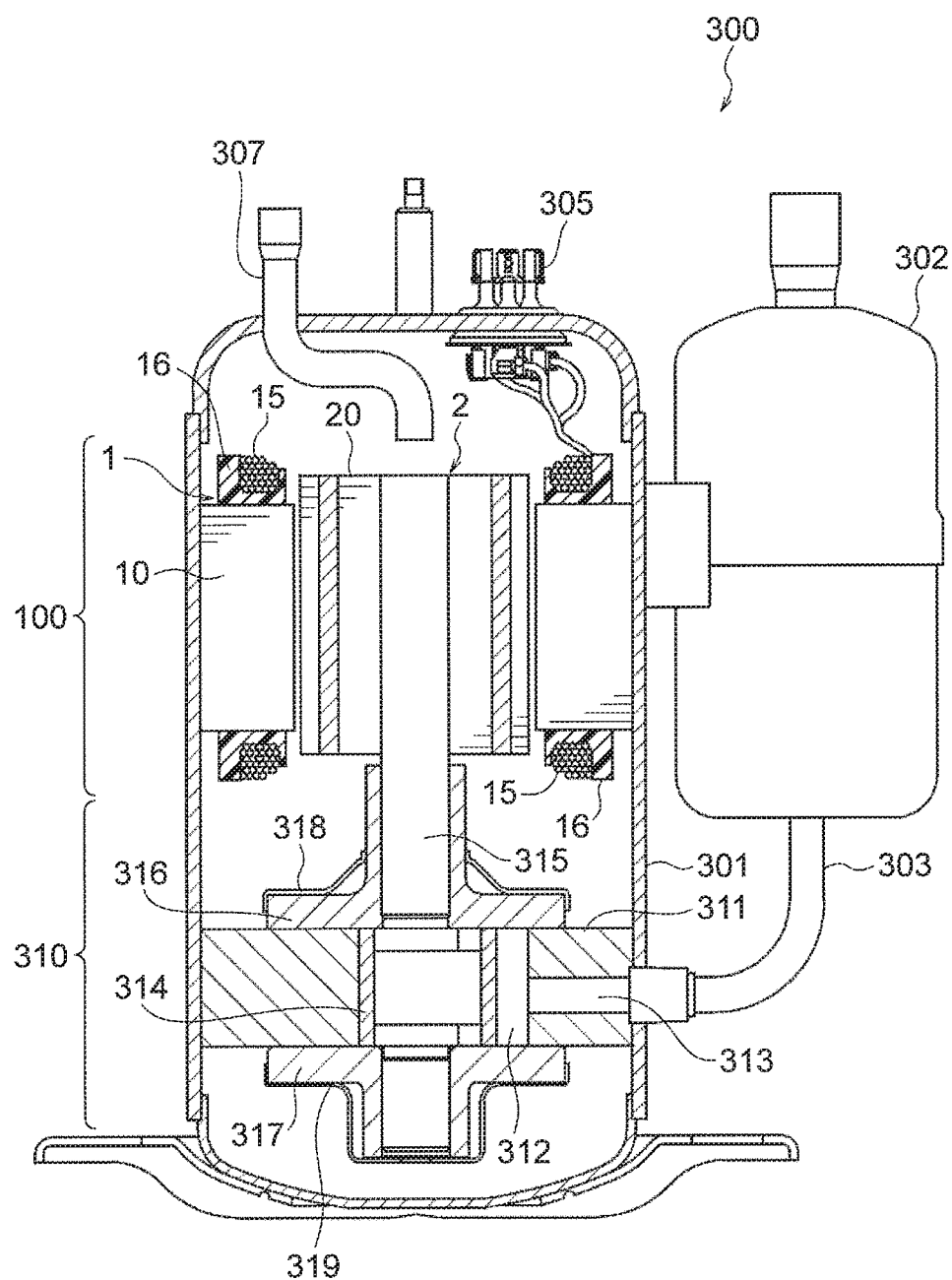
FIG. 8 is a sectional view of a compressor of the first embodiment.

The coil 15 (FIG. 8) as a stator winding is wound around each of the teeth 12. The coil 15 is formed by winding magnet wires around the teeth 12 via an insulator 16 (FIG. 8). Moreover, the coil 15 has three-phase windings (U phase, V phase, and W phase) connected in a star connection.

The stator core 10 has a configuration in which a plurality of (here, nine) blocks, one for each tooth 12, are connected to each other via thin wall parts. For example, in a state where the stator core 10 is linearly expanded, the magnet wire (the coil 15) having a diameter of 1.0 mm is wound 80 turns on each tooth 12 of the stator core 10, and thereafter the stator core 10 is bent into an annular shape and both end portions thereof are welded together. Incidentally, the stator core 10 is not limited to a configuration in which a plurality of blocks are connected as described above.

Figure 3:
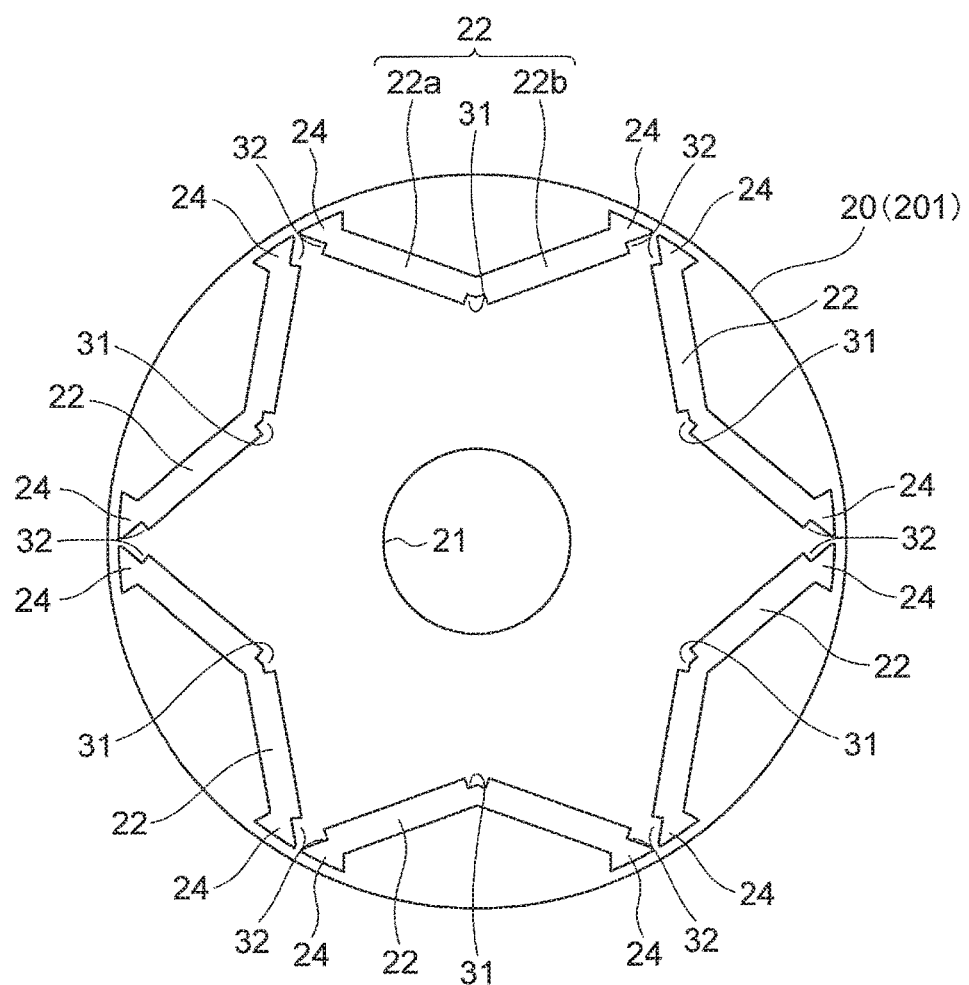
FIG. 3 is a sectional view of a rotor core illustrating the first electromagnetic steel sheet of the first embodiment in a planar view.
Figure 4:
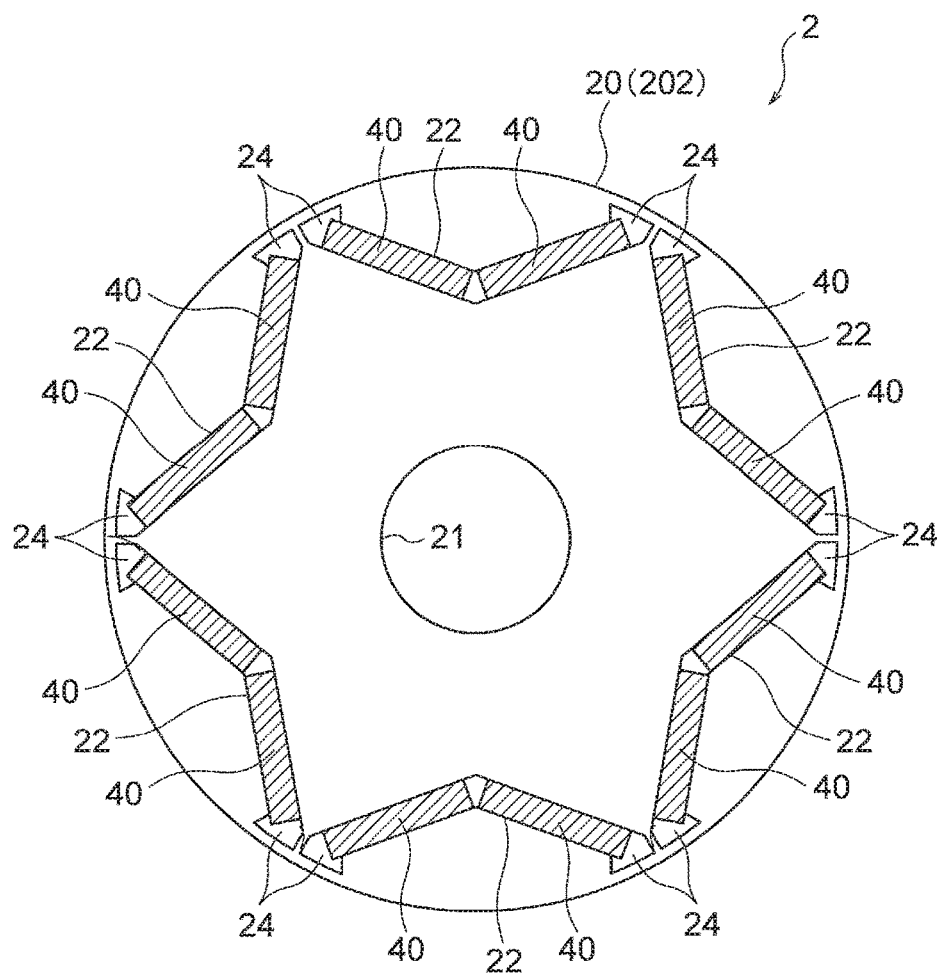
FIG. 4 is a sectional view of the rotor illustrating a second electromagnetic steel sheet of the first embodiment in a planar view.
Figure 5:
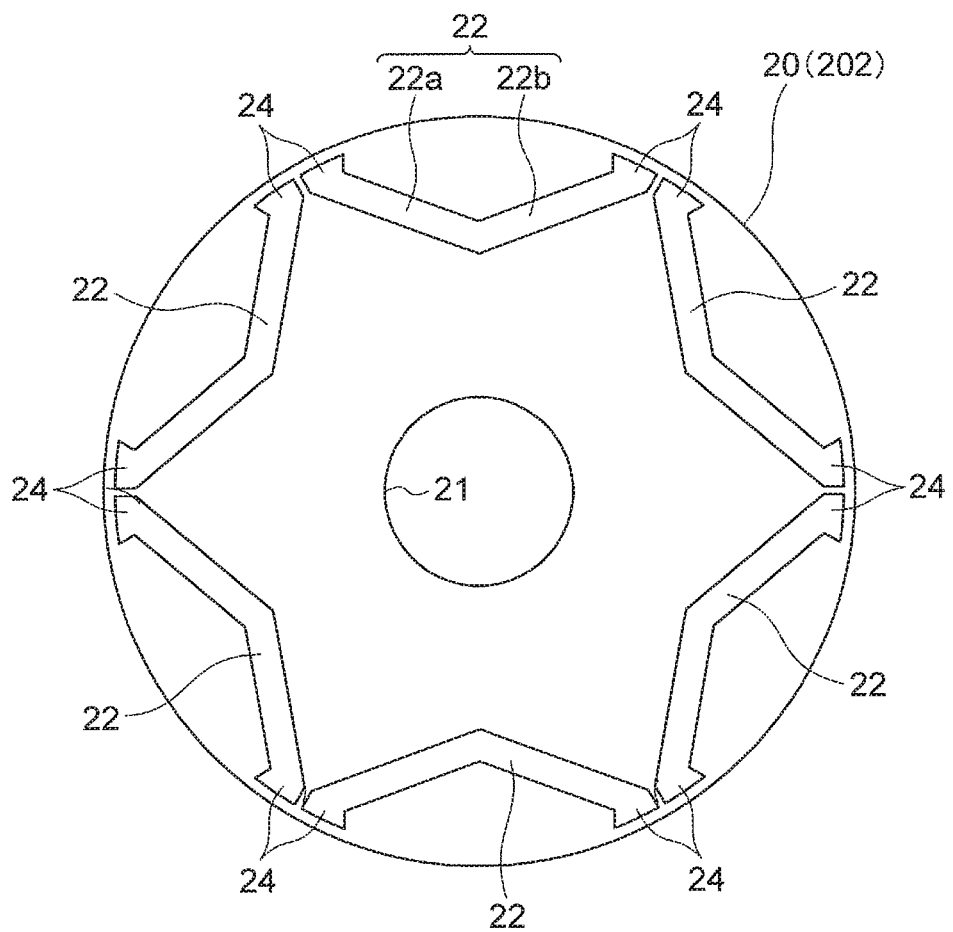
FIG. 5 is a sectional view of the rotor core illustrating the second electromagnetic steel sheet of the first embodiment in a planar view.

Next, a configuration of the rotor 2 will be described. The rotor 2 includes a rotor core 20 and permanent magnets 40 mounted on the rotor core 20. The rotor core 20 is obtained by stacking a plurality of electromagnetic steel sheets each having thickness of 0.1 to 0.7 mm (here, 0.35 mm) in the direction of the rotation axis and fixing the electromagnetic steel sheets by caulking. Here, the rotor core 20 is configured by stacking two types of electromagnetic steel sheets, that is, first electromagnetic steel sheets 201 (FIGS. 2 to 3) and second electromagnetic steel sheets 202 (FIGS. 4 to 5).

Figure 2:
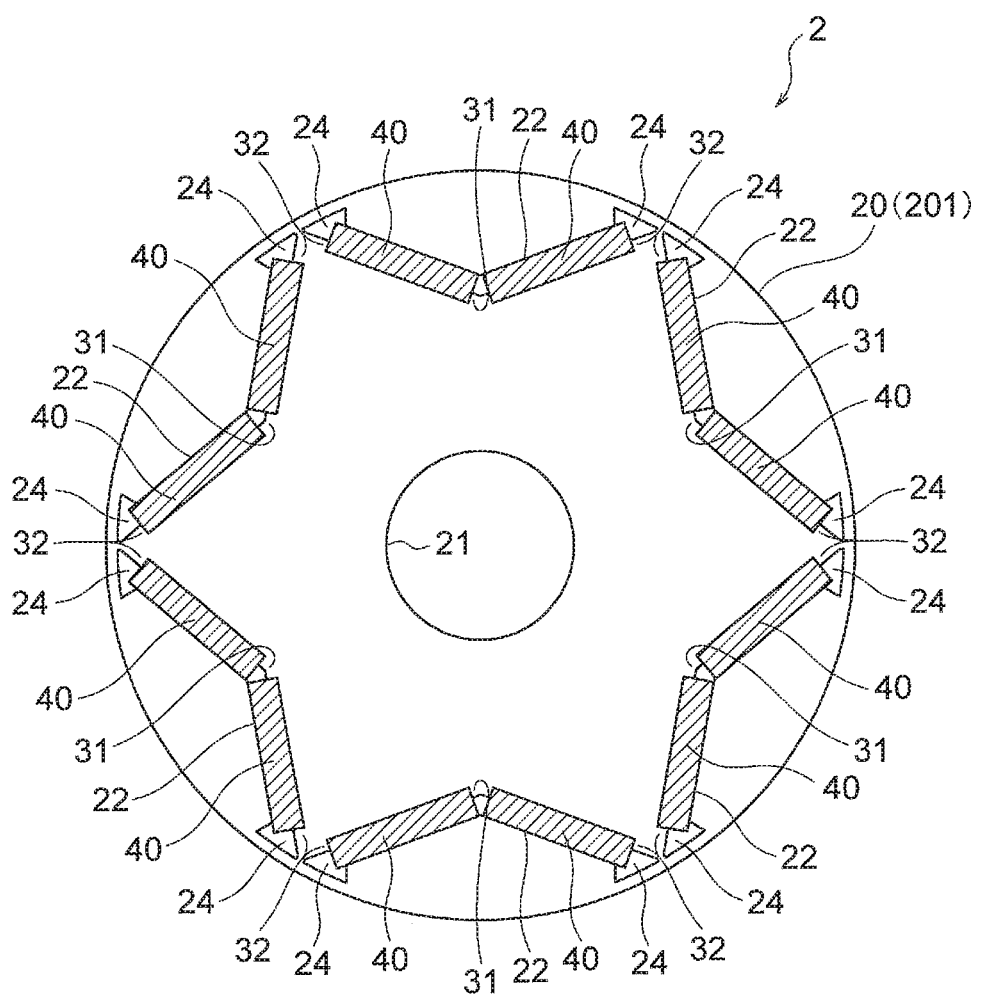
FIG. 2 is a sectional view of a rotor illustrating a first electromagnetic steel sheet of the first embodiment in a planar view.

FIG. 2 is a sectional view of the rotor 2 illustrating the first electromagnetic steel sheet 201 in a planar view. The rotor core 20 has a cylindrical shape, and a shaft hole 21 (a center hole) is formed at a center in a radial direction. A shaft (for example, a shaft 315 of the rotary compressor 300 illustrated in FIG. 8) as a rotation shaft of the rotor 2 is fixed in the shaft hole 21 by shrink fitting, press fitting, or the like.

Hereinafter, a direction along an outer circumference (a circumference of a circle) of the rotor core 20 is simply referred to as a "circumferential direction". Moreover, an axial direction (the direction of the rotation axis) of the rotor core 20 is simply referred to as an "axial direction". Moreover, the radial direction of the rotor core 20 is simply referred to as a "radial direction".

A plurality of (here, six) magnet insertion holes 22 in which the permanent magnets 40 are inserted are formed along an outer circumferential surface of the rotor core 20. The magnet insertion holes 22 are openings, and each magnet insertion hole 22 corresponds to one magnetic pole. Here, six magnet insertion holes 22 are provided, and thus the rotor 2 has six poles in total. Incidentally, the number of poles is not limited to six, and need only be two or more. Moreover, a portion between the magnet insertion holes 22 adjacent to each other is an interpolar portion.

Two permanent magnets 40 are disposed in each magnet insertion hole 22. That is, two permanent magnets 40 are disposed corresponding to each magnetic pole. Here, the rotor 2 has six poles as described above, and thus has twelve permanent magnets 40 in total.

The permanent magnet 40 is a flat plate member elongated in the axial direction of the rotor core 20, has a width in the circumferential direction of the rotor core 20, and has a thicknesses in the radial direction. The thickness of the permanent magnet 40 is, for example, 2 mm. The permanent magnet 40 is formed of, for example, a rare earth magnet containing neodymium (Nd), iron (Fe), and boron (B) as principal components, but this will be described later.

The permanent magnet 40 is magnetized in a thickness direction. Moreover, two permanent magnets 40 disposed in each magnet insertion hole 22 are magnetized so that the same magnetic poles are directed toward the same side in the radial direction. For example, two permanent magnets 40 disposed in a certain magnet insertion hole 22 are magnetized so that their radially inner sides form N poles and their radially outer sides form S poles.

Next, a configuration of the rotor core 20 will be described. FIG. 3 is a sectional view of the rotor core 20 illustrating the first electromagnetic steel sheet 201 in a planar view. The magnet insertion holes 22 are evenly arranged in the circumferential direction of the rotor core 20. Moreover, each magnet insertion hole 22 has a V-shape such that a center portion in the circumferential direction protrudes radially inward.

Moreover, the magnet insertion hole 22 includes a first section 22a and a second section 22b on respective sides of the center portion (a part forming an apex of the V-shape) in the circumferential direction. The first section 22a and the second section 22b of the magnet insertion hole 22 both extend straight, and the permanent magnet 40 (FIG. 2) is inserted in each of the first section 22a and the second section 22b.

That is, two permanent magnets 40 are arranged in a V-shape at the magnetic pole of the rotor 2. With this arrangement, electrical resistances of the permanent magnets increase, and in-plane eddy current loss can be reduced, as compared with a case in which one permanent magnet 40 is disposed corresponding to each magnetic pole. As a result, loss during driving of the motor 100 can be reduced, and efficiency of the motor 100 can be enhanced.

Flux barriers 24 are formed on both sides of the magnet insertion hole 22 in the circumferential direction. The flux barriers 24 are openings formed continuously with the magnet insertion hole 22. The flux barriers 24 are provided for suppressing leakage magnetic flux between the magnetic poles adjacent to each other (i.e., magnetic flux flowing through the interpolar portion).

A region between the outer circumference and the flux barrier 24 of the rotor core 20 is formed to have a narrow magnetic path, in order to prevent magnetic flux from short circuiting between the permanent magnets 40 of the magnetic poles adjacent to each other. Here, a distance between the outer circumference of the rotor core 20 and the flux barrier 24 is set to be the same as a thickness (for example, 0.35 mm) of the electromagnetic steel sheet as a part of the rotor core 20.

The rotor core 20 has a first magnet holding portion 31 as a protrusion at a center portion (a circumferential center portion) of the magnet insertion hole 22 in the circumferential direction. The first magnet holding portion 31 is disposed between two permanent magnets 40 (FIG. 2) adjacent to each other in the magnet insertion hole 22.

The first magnet holding portion 31 is formed to protrude inward of the permanent magnet 40 in the thickness direction of the permanent magnet 40 with respect to a plate surface (a flat surface) of the permanent magnet 40. In other words, the first magnet holding portion 31 is formed to be contactable with mutually facing end surfaces of two permanent magnets 40.

Moreover, the rotor core 20 has second magnet holding portions 32 as protrusions at both end portions (circumferential end portions) of the magnet insertion hole 22 in the circumferential direction. In the circumferential direction, the second magnet holding portions 32 are disposed on outer sides of two mutually adjacent permanent magnets 40 (FIG. 2) in the magnet insertion holes 22.

The second magnet holding portion 32 is formed to protrude inward of the permanent magnet 40 in the thickness direction of the permanent magnet 40 with respect to the plate surface (the flat surface) of the permanent magnet 40. In other words, the second magnet holding portions 32 are formed to be contactable with mutually remote end surfaces of two permanent magnets 40.

A width (a size in the thickness direction of the permanent magnet 40) of the magnet insertion hole 22 is set so that the permanent magnets 40 can be held in the magnet insertion hole 22 without backlash. Moreover, when the thickness of the permanent magnet 40 is 2 mm, the protruding amount of each of the magnet holding portions 31 and 32 in the thickness direction of the permanent magnet 40 is set to, for example, 0.5 mm.

The magnet holding portions 31 and 32 are formed as parts of the rotor core 20, and position (regulate positions of) the permanent magnets 40 so as to prevent the permanent magnets 40 from moving in the magnet insertion hole 22 in the circumferential direction. When the motor 100 is driven, the magnetic flux generated by the coil 15 of the stator 1 and the permanent magnets 40 interact with each other, and an electromagnetic force is generated in a direction to move the permanent magnets 40 in the magnet insertion holes 22. By disposing the magnet holding portions 31 and 32, movement of the permanent magnets 40 can be suppressed, and generation of vibrating sound associated with the movement of the permanent magnets 40 can be suppressed.

Another configuration for positioning the permanent magnets 40 in the magnet insertion hole 22 is one in which a bridge portion is disposed at the center portion of the magnet insertion hole 22 in the circumferential direction to divide the magnet insertion hole 22 into two parts. However, the bridge portion is formed of magnetic material, and thus short circuiting of magnetic flux occurs. That is, for example, the magnetic flux from the N pole of the permanent magnet 40 passes through the bridge portion and flows into the S pole of the same permanent magnet 40. Such short circuiting of the magnetic flux causes a decrease in magnet torque.

In contrast, by employing a configuration having the protrusion-shaped magnet holding portions 31 and 32 in the magnet insertion hole 22 in which a plurality of permanent magnets 40 are disposed, the short circuiting of the magnetic flux which may occur when the bridge portion is provided can be suppressed, and the decrease in magnet torque can be suppressed.

Here, mutually facing sides of two permanent magnets 40 are positioned by one first magnet holding portion 31 disposed at the center portion of the magnet insertion hole 22 in the circumferential direction. However, two first magnet holding portions 31 may be disposed at the center portion of the magnet insertion hole 22 in the circumferential direction so that each of two first magnet holding portions 31 positions corresponding one of the permanent magnets 40.

The magnet holding portions 31 and 32 are formed on a radially inner side of the magnet insertion hole 22. That is, clearances are formed on radially outer sides of the magnet holding portions 31 and 32. The reason why the magnet holding portions 31 and 32 are not formed on the radially outer side of the magnet insertion hole 22 but are formed on the radially inner side of the magnet insertion hole 22 is for the purpose of enhancing an effect of suppressing demagnetization of the permanent magnets 40.

Here, the demagnetization of the permanent magnets 40 will be described. When the motor 100 is driven, the magnetic flux generated by the coil 15 of the stator 1 passes through the rotor core 20 on an outer circumferential side of the permanent magnets 40. Thus, a magnetic attractive force is generated, and a rotation torque for rotating the rotor 2 is generated.

When a large current flows through the coil 15 of the stator 1, or when a current phase is changed, the magnetic flux generated by the coil 15 may act on the permanent magnet 40 in a direction to cancel magnetization of the permanent magnet 40. Then, when a value of the current flowing through the coil 15 exceeds a threshold value, a phenomenon called demagnetization occurs in which the magnetization of the permanent magnet 40 reverses its direction and does not return to an original state.

When the magnet holding portions 31 and 32 are disposed on the radially outer side of the magnet insertion holes 22, magnetic paths are easily formed by the magnet holding portions 31 and 32 integrally with a region of the rotor core 20 on the radially outer side of the magnet insertion hole 22, because the magnet holding portions 31 and 32 are formed of magnetic material. This region allows the magnetic flux generated by the coil 15 to easily flow therethrough, and thus end portions of the permanent magnets 40 adjacent to the magnet holding portions 31 and 32 are easily demagnetized.

Therefore, the magnet holding portions 31 and 32 are not disposed on the radially outer side of the magnet insertion hole 22, but are disposed on the radially inner side of the magnet insertion hole 22. With this arrangement, clearances (i.e., clearances inside the magnet insertion hole 22) are formed between the region of the rotor core 20 on the radially outer side of the magnet insertion hole 22 and the magnet holding portions 31 and 32. Therefore, the magnetic flux generated by the coil 15 is less likely to flow in the magnet holding portions 31 and 32, and the demagnetization of the permanent magnets 40 is less likely to occur.

There is an air gap inside the magnet insertion hole 22, and magnetic resistance therein is very large. In the magnet insertion hole 22, the magnetic resistance is locally small at parts where the magnet holding portions 31 and 32 are disposed. Therefore, as the current flowing through the coil 15 becomes larger, the magnetic flux generated by the coil 15 may flow through the magnet holding portions 31 and 32, and thus the end portions of the permanent magnet 40 adjacent to the magnet holding portions 31 and 32 may be demagnetized.

Thus, in this first embodiment, the rotor core 20 has a configuration in which two types of electromagnetic steel sheets (the first electromagnetic steel sheets 201 and the second electromagnetic steel sheets 202) are stacked. As illustrated in FIG. 3, the first electromagnetic steel sheet 201 has the first magnet holding portion 31 at the center portion of the magnet insertion hole 22 in the circumferential direction, and has the second magnet holding portions 32 at the end portions of the magnet insertion hole 22 in the circumferential direction.

FIG. 4 is a sectional view of the rotor 2 illustrating the second electromagnetic steel sheet 202 in a planar view. FIG. 5 is a sectional view of the rotor core 20 illustrating the second electromagnetic steel sheet 202 in a planar view.

The second electromagnetic steel sheet 202 has a plurality of (here, six) magnet insertion holes 22, as is the case with the first electromagnetic steel sheet 201. The magnet insertion hole 22 has a V-shape such that the center portion in the circumferential direction protrudes radially inward, and two permanent magnets 40 are disposed in each magnet insertion hole 22. However, the magnet holding portions 31 and 32 are not disposed in the magnet insertion hole 22 of the second electromagnetic steel sheet 202.

Figure 6:
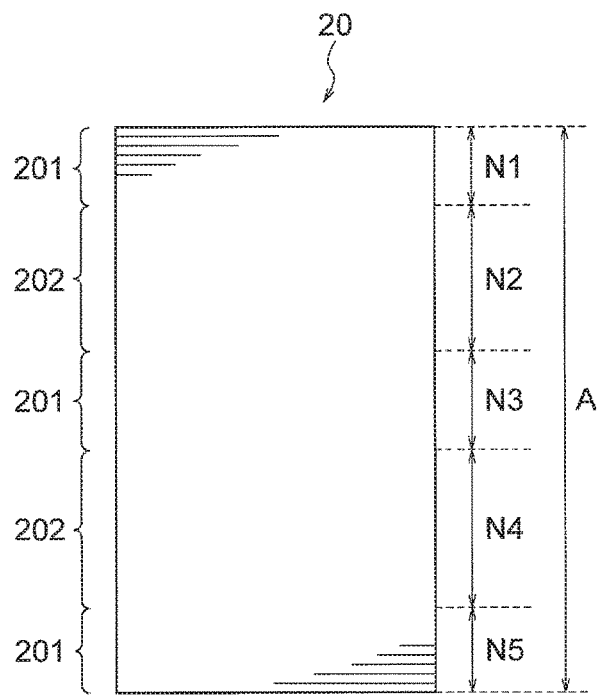
FIG. 6 is a diagram illustrating a stacked structure of the rotor core of the first embodiment.

FIG. 6 is a diagram illustrating a stacked structure of the rotor core 20. The rotor core 20 has a configuration in which N1 first electromagnetic steel sheets 201, N2 second electromagnetic steel sheets 202, N3 first electromagnetic steel sheets 201, N4 second electromagnetic steel sheets 202, and N5 first electromagnetic steel sheets 201 are stacked in the direction of the rotation axis in order from the top in FIG. 6. That is, the first electromagnetic steel sheets 201 are disposed at both ends and the center of the rotor core 20 in the direction of the rotation axis (a stacking direction).

The total number A of the electromagnetic steel sheets constituting the rotor core 20 is N1+N2+N3+N4+N5. Among the electromagnetic steel sheets constituting the rotor core 20, the number B of the electromagnetic steel sheets (the first electromagnetic steel sheets 201) having the first magnet holding portions 31 between the permanent magnets 40 adjacent to each other in the magnet insertion holes 22 is N1+N3+N5. Moreover, the number C of the electromagnetic steel sheets (the first electromagnetic steel sheets 201) having the second magnet holding portions 32 at the end portions of the magnet insertion holes 22 in the circumferential direction is also N1+N3+N5.

That is, relationships A>B and A>C are satisfied, among the total number A of the electromagnetic steel sheets constituting the rotor core 20, the number B of the electromagnetic steel sheets (the first electromagnetic steel sheets 201) having the first magnet holding portions 31 between the permanent magnets 40 adjacent to each other in the magnet insertion holes 22, and the number C of the electromagnetic steel sheets (the first electromagnetic steel sheets 201) having the second magnet holding portions 32 at the end portions of the magnet insertion holes 22 in the circumferential direction.

In this first embodiment, the permanent magnets 40 can be positioned in the magnet insertion holes 22 by the magnet holding portions 31 and 32 provided in the first electromagnetic steel sheets 201 of the rotor core 20. Moreover, the magnet holding portions 31 and 32 are not provided in the second electromagnetic steel sheets 202 of the rotor core 20, and thus even when a large current flows through the coil 15 of the stator 1, the demagnetization of the permanent magnets 40 due to the magnetic flux flowing into the permanent magnets 40 from the magnet holding portions 31 and 32 can be suppressed.

As described above, in this first embodiment, the relationships A>B and A>C are satisfied among the total number A of the electromagnetic steel sheets constituting the rotor core 20, the number B of the electromagnetic steel sheets (the first electromagnetic steel sheets 201) having the first magnet holding portions 31, and the number C of electromagnetic steel sheets (the first electromagnetic steel sheets 201) having the second magnet holding portions 32, and therefore the permanent magnets 40 can be positioned in the magnet insertion holes 22, and the demagnetization of the permanent magnets 40 can be suppressed.

In particular, by disposing the first electromagnetic steel sheets 201 at least one end of the rotor core 20 in the direction of the rotation axis, the magnet holding portions 31 and 32 function as guides for the permanent magnets 40 when the permanent magnets 40 are inserted into the magnet insertion holes 22. Therefore, an inserting operation of the permanent magnets 40 is facilitated.

Moreover, the first electromagnetic steel sheets 201 are disposed at both end portions and the center portion of the rotor core 20 in the direction of the rotation axis, and thereby the permanent magnet 40 is held by the magnet holding portions 31 and 32 of the first electromagnetic steel sheets 201 at intervals in a longitudinal direction of the permanent magnet 40 (the direction of the rotation axis of the rotor core 20). Therefore, inclination of the permanent magnets 40 in the magnet insertion holes 22 can be effectively suppressed.

Figure 7:
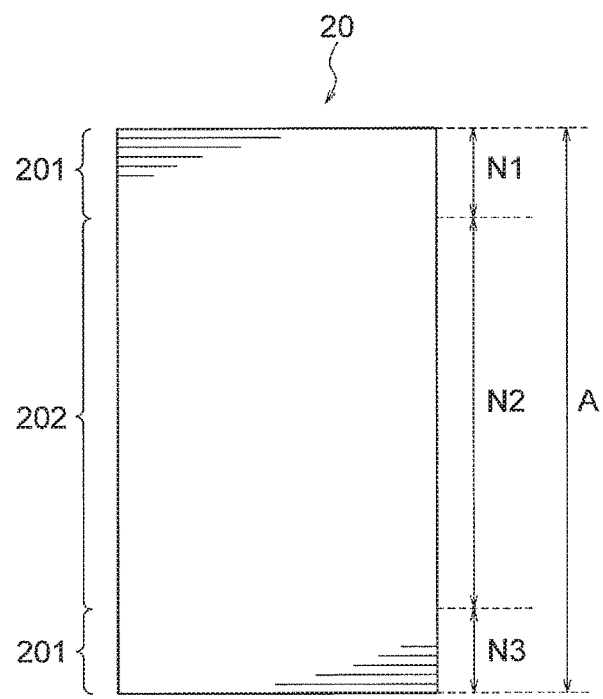
FIG. 7 is a diagram illustrating another example of the stacked structure of the rotor core of the first embodiment.

Incidentally, the stacked structure of the rotor core 20 is not limited to the stacked structure illustrated in FIG. 6. For example, as illustrated in FIG. 7, it is also possible that the first electromagnetic steel sheets 201 are stacked at both ends in the direction of the rotation axis of the rotor core 20, and the second electromagnetic steel sheets 202 are stacked in remaining parts. Even with such a stacked structure, the permanent magnets 40 can be positioned in the magnet insertion holes 22 and the demagnetization of the permanent magnets 40 can be suppressed.

Next, a configuration of the permanent magnet 40 will be described. As described above, the permanent magnet 40 is formed of a rare earth magnet containing neodymium (Nd), iron (Fe), and boron (B) as principal components, and contains no dysprosium (Dy). The permanent magnet 40 has a residual magnetic flux density of 1.27 to 1.42 T at 20° C., and a coercivity of 1671 to 1922 kA/m at 20° C.

The rare earth magnet containing neodymium, iron, and boron as principal components has a property that coercivity decreases with a rise in temperature, and a decreasing rate of the coercivity is −0.5 to −0.6%/K. When the motor 100 is used in a compressor, the motor 100 is used in a high temperature atmosphere of 100 to 150° C. In this case, the motor 100 is used at a temperature that is higher than a normal temperature (20° C.) by approximately 130° C., and thus the coercivity decreases by 65% at 150° C. when the decreasing rate of the coercivity of the permanent magnet 40 is −0.5%/K. For this reason, in general, dysprosium is added to the permanent magnet to enhance the coercivity. The coercivity increases in proportion to dysprosium content.

In order to prevent the demagnetization of the permanent magnet under a maximum load expected in the compressor, a coercivity of approximately 1100 to 1500 A/m is needed. In order to obtain this coercivity at an ambient temperature of 150° C., the coercivity at the normal temperature (20° C.) needs to be 1800 to 2300 A/m.

The rare earth magnet containing neodymium, iron, and boron as principal components exhibits the coercivity of approximately 1800 A/m at the normal temperature when dysprosium is not added thereto. Therefore, 2 wt % of dysprosium needs to be added in order to obtain the coercivity of 2300 A/m. It is known that a price of dysprosium is unstable, and procurement risk exists.

Moreover, when dysprosium is added to the permanent magnet, the residual magnetic flux density decreases. As the residual magnetic flux density decreases, the magnet torque of the motor decreases, and the current needed to obtain a desired output increases. That is, copper loss increases, and efficiency of the motor decreases. For these reasons, reduction of an additive amount of dysprosium is required.

Thus, the permanent magnet 40 used in this first embodiment is formed of a rare earth magnet containing neodymium, iron, and boron as principal components, and contains no dysprosium. The rare earth magnet (containing neodymium, iron, and boron as principal components) containing no dysprosium as described above has a residual magnetic flux density of 1.27 to 1.42 T at 20° C. and a coercivity of 1671 to 1922 kA/m at 20° C.

In this first embodiment, the rotor 2 has the above described structure in which the first electromagnetic steel sheets 201 and the second electromagnetic steel sheets 202 are stacked, and thereby suppresses the demagnetization of the permanent magnets 40. Therefore, even when the permanent magnets 40 contain no dysprosium (have the residual magnetic flux density of 1.27 to 1.42 T at 20° C., and the coercivity of 1671 to 1922 kA/m at 20° C.), the demagnetization of the permanent magnets 40 can be suppressed. In addition, the decrease in residual magnetic flux density due to the addition of dysprosium can be avoided, and thus a current value needed to obtain the same torque can be reduced. As a result, the copper loss can be reduced, and the efficiency of the motor can be enhanced.

Next, a rotary compressor 300 using the motor 100 will be described. FIG. 8 is a sectional view illustrating a configuration of the rotary compressor 300. The rotary compressor 300 includes a frame 301, a compression mechanism 310 provided in the frame 301, and the motor 100 for driving the compression mechanism 310.

The compression mechanism 310 includes a cylinder 311 including a cylinder chamber 312, a shaft 315 rotated by the motor 100, a rolling piston 314 fixed to the shaft 315, vanes (not illustrated in the figure) dividing an inside of the cylinder chamber 312 into a suction side and a compression side, and an upper frame 316 and a lower frame 317 through which the shaft 315 is inserted and which close end surfaces of the cylinder chamber 312 in the axial direction. An upper discharge muffler 318 is mounted to the upper frame 316, and a lower discharge muffler 319 is mounted to the lower frame 317.

The frame 301 is a cylindrical container formed by drawing a steel plate having a thickness of, for example, 3 mm. Refrigerating machine oil (not illustrated in the figure) for lubricating each sliding portion of the compression mechanism 310 is stored in a bottom part of the frame 301. The shaft 315 is held rotatably by the upper frame 316 and the lower frame 317.

The cylinder 311 has the cylinder chamber 312 therein. The rolling piston 314 eccentrically rotates in the cylinder chamber 312. The shaft 315 has an eccentric shaft part, and the rolling piston 314 engages the eccentric shaft part.

The stator core 10 of the motor 100 is mounted to an inner side of the frame 301 by shrink fitting. Electric power is supplied to the coil 15 wound around the stator core 10 from a glass terminal 305 fixed to the frame 301. The shaft 315 is fixed in the shaft hole 21 (FIG. 1) of the rotor 2.

An accumulator 302 storing refrigerant gas is mounted outside the frame 301. A suction pipe 303 is fixed to the frame 301, and the refrigerant gas is supplied from the accumulator 302 to the cylinder 311 via this suction pipe 303. Moreover, a discharge pipe 307 for discharging the refrigerant to outside is provided at an upper part of the frame 301.

As the refrigerant, for example, R410A, R407C, R22, or the like can be used. Moreover, it is desirable to use refrigerant having a low GWP (Global Warming Potential) in terms of global warming prevention. For example, the following refrigerant can be used as the low GWP refrigerant.
(1) First, a halogenated hydrocarbon having a carbon double bond in its composition such as HFO (Hydro-Fluoro-Olefin)-1234yf (CF3CF=CH2) can be used. A GWP of HFO-1234yf is 4.
(2) Moreover, a hydrocarbon having a carbon double bond in its composition such as R1270 (propylene) may be used. R1270 has a GWP of 3, which is lower than that of HFO-1234yf, but has higher combustibility than that of HFO-1234yf.
(3) Moreover, a mixture including at least one of a halogenated hydrocarbon having a carbon double bond in its composition or a hydrocarbon having a carbon double bond in its composition such as a mixture of HFO-1234yf and R32 may be used. Since the above described HFO-1234yf is a low pressure refrigerant and tends to cause an increase in pressure loss, its use may lead to a deterioration in performance of the refrigeration cycle (particularly, the evaporator). Therefore, it is practically desirable to use a mixture of HFO-1234yf with R32 or R41 which is a higher pressure refrigerant than HFO-1234yf.

An operation of the rotary compressor 300 is as described below. The refrigerant gas supplied from the accumulator 302 is supplied into the cylinder chamber 312 of the cylinder 311 through the suction pipe 303. When the motor 100 is driven and the rotor 2 rotates, the shaft 315 rotates together with the rotor 2. Then, the rolling piston 314 engaging the shaft 315 eccentrically rotates in the cylinder chamber 312, and the refrigerant is compressed in the cylinder chamber 312. The compressed refrigerant passes through the discharge mufflers 318 and 319, then flows upward inside the frame 301 through air holes (not illustrated in the figure) provided in the motor 100, and is discharged from the discharge pipe 307.

Figure 9:
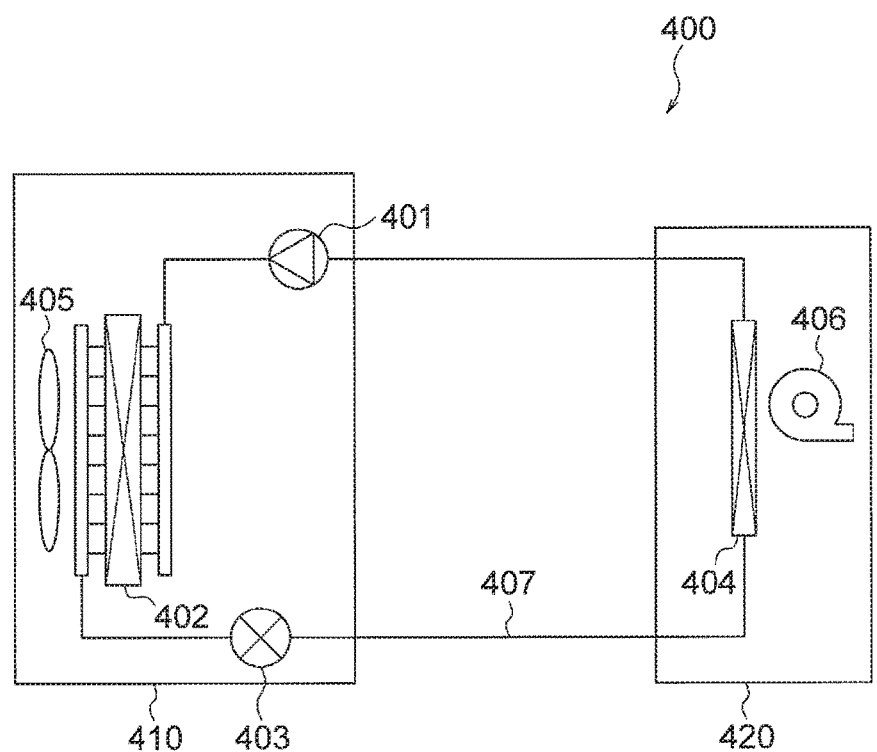
FIG. 9 is a diagram of a refrigeration and air conditioning apparatus of the first embodiment.

Next, a refrigeration and air conditioning apparatus 400 of the first embodiment will be described. FIG. 9 is a diagram illustrating a configuration of the refrigeration and air conditioning apparatus 400 of the first embodiment. The refrigeration and air conditioning apparatus 400 illustrated in FIG. 9 includes a compressor 401, a condenser 402, a restrictor (an expansion valve) 403, and an evaporator 404. The compressor 401, the condenser 402, the restrictor 403, and the evaporator 404 are connected by a refrigerant pipe 407 to configure a refrigeration cycle. That is, the refrigerant circulates in order of the compressor 401, the condenser 402, the restrictor 403, and the evaporator 404.

The compressor 401, the condenser 402, and the restrictor 403 are provided in an outdoor unit 410. The compressor 401 is constituted by the rotary compressor 300 illustrated in FIG. 8. An outdoor blower 405 for supplying outdoor air to the condenser 402 is provided in the outdoor unit 410. The evaporator 404 is provided in an indoor unit 420. An indoor blower 406 for supplying indoor air to the evaporator 404 is provided in the indoor unit 420.

An operation of the refrigeration and air conditioning apparatus 400 is as described below. The compressor 401 compresses suctioned refrigerant and delivers the refrigerant. The condenser 402 exchanges heat between the refrigerant flowing from the compressor 401 and the outdoor air, condenses and liquefies the refrigerant, and delivers the refrigerant to the refrigerant pipe 407. The outdoor blower 405 supplies the outdoor air to the condenser 402. The restrictor 403 regulates a pressure or the like of the refrigerant flowing through the refrigerant pipe 407 by changing an opening degree.

The evaporator 404 exchanges heat between the refrigerant brought into a low pressure state by the restrictor 403 and the indoor air, allows the refrigerant to draw heat from the air and evaporate (vaporize), and delivers the refrigerant to the refrigerant pipe 407. The indoor blower 406 supplies the indoor air to the evaporator 404. Thus, cool wind whose heat is drawn by the evaporator 404 is supplied into a room.

The compressor 401 of the refrigeration and air conditioning apparatus 400 is used in a high temperature atmosphere, and a large load fluctuation occurs when the compressor 401 performs compression. At high temperature, the coercivity of the permanent magnet 40 tends to decrease, and fluctuation of the current flowing through the coil 15 increases due to the load fluctuation. The motor 100 of the first embodiment is configured to suppress the demagnetization of the permanent magnets 40 as described above, and thus is suitable for use in the compressor 401 of the refrigeration and air conditioning apparatus 400.

As described above, according to the first embodiment of the present invention, A>B and A>C are satisfied, among the total number A of the electromagnetic steel sheets constituting the rotor core 20, the number B of the electromagnetic steel sheets (the first electromagnetic steel sheets 201)

having the first magnet holding portions 31, and the number C of the electromagnetic steel sheets (the first electromagnetic steel sheets 201) having the second magnet holding portions 32. Therefore, the permanent magnets 40 can be positioned in the magnet insertion holes 22, and the demagnetization of the permanent magnets 40 due to the magnetic flux passing through the magnet holding portions 31 and 32 can be suppressed. Moreover, by suppressing the demagnetization of the permanent magnets 40 in this way, a deterioration in performance of the motor 100 is suppressed, and a stable drive control is enabled.

Moreover, the magnet holding portions 31 and 32 are formed to protrude inward of the permanent magnet 40 in the thickness direction of the permanent magnet 40 from the plate surface of the permanent magnet 40. Therefore, the permanent magnets 40 can be effectively positioned in the magnet insertion holes 22.

Moreover, the magnet holding portions 31 and 32 are disposed on the radially inner side of the magnet insertion holes 22 of the rotor core 20. Therefore, the magnetic flux generated by the coil 15 of the stator 1 is less likely to flow through the magnet holding portions 31 and 32, and the demagnetization of the permanent magnets 40 due to the magnetic flux flowing through the magnet holding portions 31 and 32 can be suppressed.

Moreover, the number B of the electromagnetic steel sheets (the first electromagnetic steel sheets 201) having the first magnet holding portions 31 is equal to the number C of the electromagnetic steel sheets (the first electromagnetic steel sheets 201) having the second magnet holding portions 32, and thus the rotor core 20 can be constituted by two types of electromagnetic steel sheets: the first electromagnetic steel sheets 201 and the second electromagnetic steel sheets 202. Therefore, types of dies for pressing the electromagnetic steel sheets can be reduced, and production cost can be reduced.

Moreover, the first electromagnetic steel sheets 201 having the magnet holding portions 31 and 32 are disposed at at least one end of the rotor core 20 in the direction of the rotation axis. Therefore, when the permanent magnets 40 are inserted into the magnet insertion holes 22, the magnet holding portions 31 and 32 function as guides for the permanent magnets 40, and the inserting operation of the permanent magnets 40 is facilitated.

Moreover, the permanent magnet 40 is a rare earth magnet containing neodymium (Nd), iron (Fe), and boron (B) as principal components, and exhibits a residual magnetic flux density in a range from 1.27 T to 1.42 T at 20° C., and a coercivity in a range from 1671 kA/m to 1922 kA/m at 20° C. Therefore, dysprosium can be made unnecessary, and the decrease in residual magnetic flux density due to the addition of dysprosium can be avoided. That is, the current value needed to obtain the same torque can be reduced, the copper loss is reduced, and the efficiency of the motor can be enhanced.

Moreover, the magnet insertion hole 22 has a V-shape such that the center portion in the circumferential direction protrudes radially inward, and two permanent magnets 40 are disposed in the magnet insertion hole 22. Therefore, two permanent magnets 40 can be arranged in a V-shape in each magnetic pole, and the in-plane eddy current loss in the permanent magnets 40 can be reduced. Thus, the efficiency of the motor can be enhanced, and an energy consumption amount can be reduced.

Moreover, the rotary compressor 300 using the motor 100 is used as, for example, the compressor 401 of the refrigeration and air conditioning apparatus 400. In this case, the motor 100 is used in a high temperature atmosphere, and is susceptible to load fluctuation. The motor 100 of the first embodiment is configured to suppress the demagnetization of the permanent magnets 40 as described above, and thus is suitable for use in the compressor 401 of the refrigeration and air conditioning apparatus 400.

Second Embodiment

Next, a second embodiment of the present invention will be described. The second embodiment is intended to effectively suppress the demagnetization of the permanent magnets 40 due to leakage magnetic flux between the permanent magnets 40 adjacent to each other in the magnet insertion hole 22.

Figure 10:
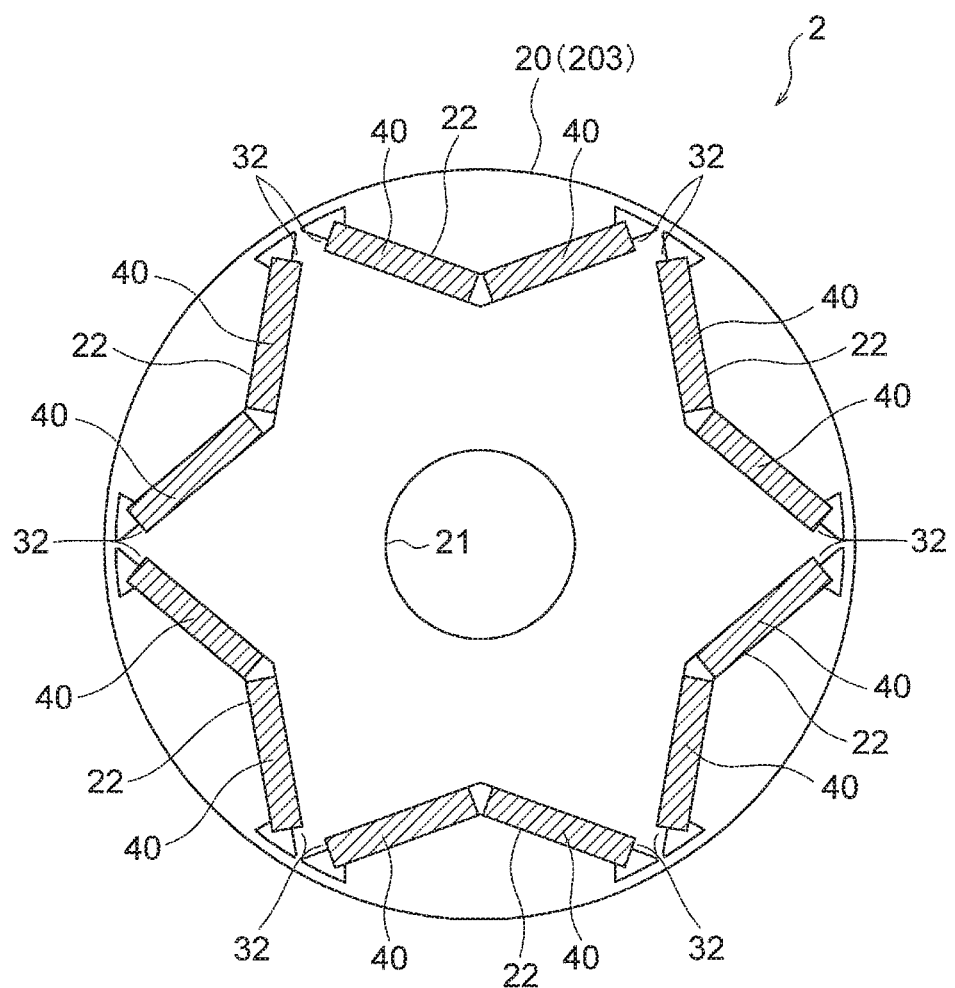
FIG. 10 is a sectional view of a rotor illustrating a third electromagnetic steel sheet of a second embodiment in a planar view.
Figure 11:
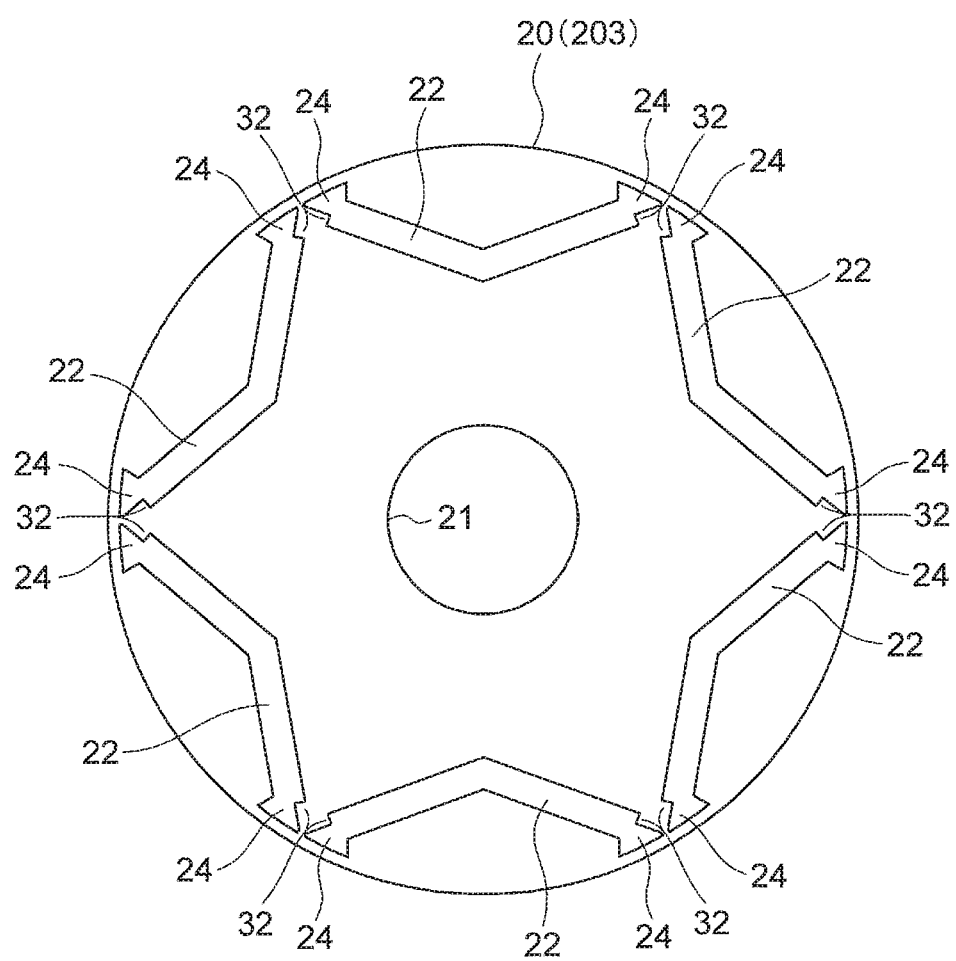
FIG. 11 is a sectional view of a rotor core illustrating the third electromagnetic steel sheet of the second embodiment in a planar view.

The rotor core 20 of the second embodiment has third electromagnetic steel sheets 203, in addition to the first electromagnetic steel sheets 201 (FIGS. 2 to 3) and the second electromagnetic steel sheets 202 (FIGS. 4 to 5) described in the first embodiment. FIG. 10 is a sectional view of the rotor 2 illustrating the third electromagnetic steel sheet 203 of the second embodiment in a planar view. FIG. 11 is a sectional view of the rotor core 20 illustrating the third electromagnetic steel sheet 203 in a planar view.

The third electromagnetic steel sheet 203 has a plurality of (here, six) magnet insertion holes 22, as is the case with the first electromagnetic steel sheet 201. The magnet insertion hole 22 has a V-shapes such that the center portion in the circumferential direction protrudes radially inward, and two permanent magnets 40 are disposed in each magnet insertion hole 22.

In this regard, as illustrated in FIG. 11, the third electromagnetic steel sheet 203 has the second magnet holding portions 32 at the end portions of the magnet insertion hole 22 in the circumferential direction, but has no first magnet holding portion 31 at the center portion of the magnet insertion hole 22. In other words, the first magnet holding portion 31 is not disposed between the permanent magnets 40 adjacent to each other in the magnet insertion hole 22.

Leakage magnetic flux tends to be generated between the permanent magnets 40 adjacent to each other in the magnet insertion hole 22. Thus, the demagnetization of the permanent magnets 40 is more likely to proceed at the center portion of the magnet insertion hole 22 than at the end portions of the magnet insertion hole 22 in the circumferential direction. Therefore, this second embodiment uses the third electromagnetic steel sheet 203 having the second magnet holding portions 32 at the end portions of the magnet insertion hole 22 in the circumferential direction and having no first magnet holding portion 31 at the center portion of the magnet insertion hole 22 in the circumferential direction.

Figure 12:
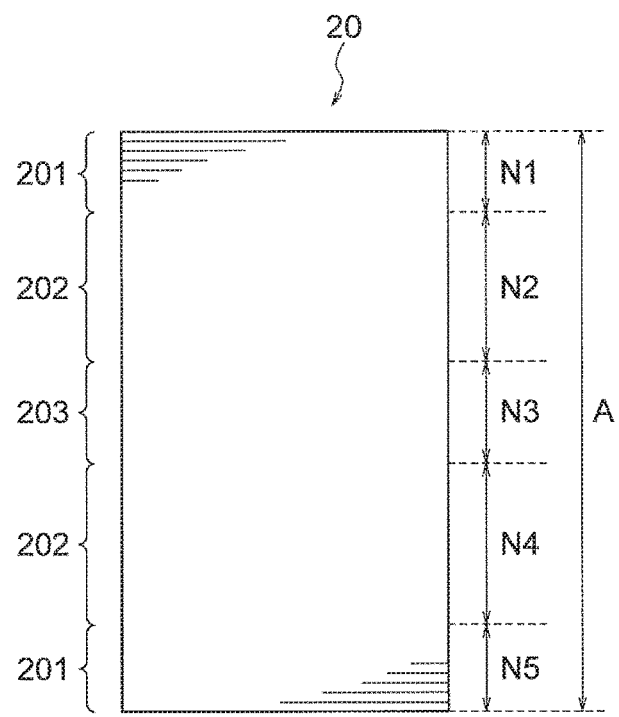
FIG. 12 is a diagram illustrating a stacked structure of the rotor core of the second embodiment.

FIG. 12 is a diagram illustrating a stacked structure of the rotor core 20 in the second embodiment. The rotor core 20 is obtained by stacking N1 first electromagnetic steel sheets 201, N2 second electromagnetic steel sheets 202, N3 third electromagnetic steel sheets 203, N4 second electromagnetic steel sheets 202, and N5 first electromagnetic steel sheets 201 in the direction of the rotation axis in order from the top in FIG. 12. That is, the first electromagnetic steel sheets 201 are disposed at both end portions of the rotor core 20, and the third electromagnetic steel sheets 203 are disposed at the center portion of the rotor core 20 in the direction of the rotation axis (a stacking direction).

The total number A of the electromagnetic steel sheets constituting the rotor core 20 is N1+N2+N3+N4+N5. Among the electromagnetic steel sheets constituting the rotor core 20, the number B of the electromagnetic steel sheets (the first electromagnetic steel sheets 201) having the first magnet holding portions 31 between the permanent magnets 40 adjacent to each other in the magnet insertion holes 22 is N1+N5. Moreover, among the electromagnetic steel sheets constituting the rotor core 20, the number C of the electromagnetic steel sheets (the first electromagnetic steel sheets 201 and the third electromagnetic steel sheets 203) having the second magnet holding portions 32 at the end portions of the magnet insertion holes 22 in the circumferential direction is N1+N3+N5.

That is, the relationship of A>C>B is satisfied among the total number A of the electromagnetic steel sheets constituting the rotor core 20, the number B of the electromagnetic steel sheets (the first electromagnetic steel sheets 201) having the first magnet holding portions 31 between the permanent magnets 40 adjacent to each other in the magnet insertion holes 22, and the number C of the electromagnetic steel sheets (the first electromagnetic steel sheets 201 and the third electromagnetic steel sheets 203) having the second magnet holding portions 32 at the end portions of the magnet insertion holes 22 in the circumferential direction.

In this second embodiment, the first electromagnetic steel sheets 201 of the rotor core 20 have the magnet holding portions 31 and 32 at the center portions and the end portions of the magnet insertion holes 22 in the circumferential direction, the third electromagnetic steel sheets 203 have the second magnet holding portions 32 at the end portions of the magnet insertion holes 22 in the circumferential direction. Therefore, the permanent magnets 40 can be positioned so that the permanent magnets 40 do not move in the magnet insertion holes 22.

Moreover, the second electromagnetic steel sheets 202 of the rotor core 20 do not have the magnet holding portions 31 or 32 in the magnet insertion holes 22, and thus even when a large current flows through the coil 15 of the stator 1, the demagnetization of the permanent magnets 40 due to the magnetic flux flowing into the permanent magnets 40 from the magnet holding portions 31 and 32 can be suppressed.

Further, the third electromagnetic steel sheets 203 of the rotor core 20 have the second magnet holding portions 32 at the end portions of the magnet insertion holes 22 in the circumferential direction and do not have the first magnet holding portions 31 at the center portions of the magnet insertion holes 22 in the circumferential direction, and therefore the demagnetization due to the leakage magnetic flux between the permanent magnets 40 adjacent to each other in the magnet insertion holes 22 can be effectively suppressed.

Moreover, as described in the first embodiment, the first electromagnetic steel sheets 201 are disposed at least one end of the rotor core 20 in the direction of the rotation axis. Therefore, the magnet holding portions 31 and 32 function as guides for the permanent magnets 40 when the permanent magnets 40 are inserted into the magnet insertion holes 22, and the inserting operation of the permanent magnets 40 is facilitated.

Moreover, inclinations of the permanent magnets 40 can be suppressed by disposing the first electromagnetic steel sheets 201 at both end portions of the rotor core 20 in the direction of the rotation axis and disposing the third electromagnetic steel sheets 203 at the center portion of the rotor core 20 in the direction of the rotation axis.

Incidentally, the motor of the second embodiment is configured in a similar manner to the motor 100 described in the first embodiment, except for the configuration of the rotor core 20. Moreover, the motor of the second embodiment can be used in the rotary compressor 300 (FIG. 8) and the refrigeration and air conditioning apparatus 400 (FIG. 9) described in the first embodiment.

Next, description will be made of a measurement result of changes of demagnetizing factors of the motor of the second embodiment and a motor of a comparative example in relation to a current.

As described above, the motor of the second embodiment includes the rotor core 20 configured by stacking the first electromagnetic steel sheets 201, the second electromagnetic steel sheets 202, and the third electromagnetic steel sheets 203 as illustrated in FIG. 12. A size of the rotor core 20 in the direction of the rotation axis is 50 mm. Thicknesses of an upper most stack and a lowermost stack of the first electromagnetic steel sheets 201 are both 5 mm. A thickness of a stack of the third electromagnetic steel sheets 203 is 5 mm. The motor of the comparative example includes a rotor core 20 constituted by only one type of electromagnetic steel sheets, i.e., the first electromagnetic steel sheets 201, and is the same as the motor of the second embodiment in other respects.

Figure 13:
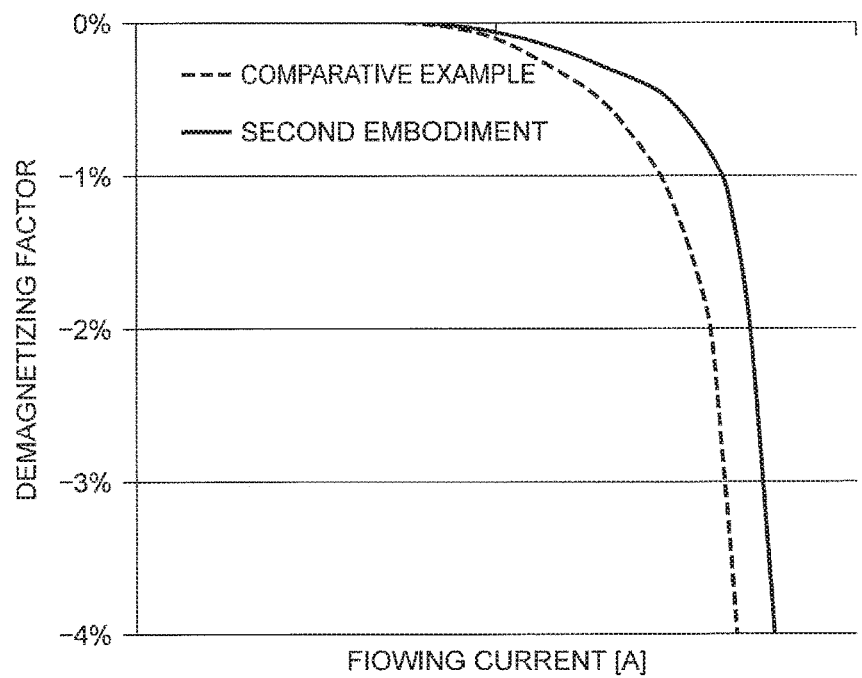
FIG. 13 is a graph illustrating changes of demagnetizing factors of a motor of the second embodiment and of a motor of a comparative example.

FIG. 13 is a graph illustrating changes of demagnetizing factors of the motor of the second embodiment and the motor of the comparative example. The horizontal axis represents a current (A) flowing through the coil 15 of the stator 1 (FIG. 1), and the vertical axis represents a demagnetizing factor (%). Here, the demagnetizing factor of the permanent magnets 40 is measured while the current flowing through the coil 15 of the stator 1 is changed from 0 A to 15 A.

In a general permanent magnet embedded type motor, an acceptance criterion of the demagnetizing factor of the permanent magnet is −3%. From the graph of FIG. 13, in the motor of the second embodiment, a current (3% demagnetization current) at which the demagnetizing factor reaches −3% increases by approximately 10% as compared with the motor of the comparative example. That is, the motor of the second embodiment has a usable current range wider than the motor of the comparative example.

Moreover, assuming that the motor of the second embodiment is driven by the same current as the motor of the comparative example, permanent magnets having a lower coercivity can be used. That is, addition of dysprosium or the like for enhancing the coercivity of the permanent magnet can be reduced in amount or eliminated. Therefore, the production cost can be reduced, and the efficiency of the motor can be enhanced by avoiding the decrease in residual magnetic flux density due to the addition of dysprosium.

As described above, in the second embodiment of the present invention, the relationship of A>C>B is satisfied, among the total number A of the electromagnetic steel sheets constituting the rotor core 20, the number B of the electromagnetic steel sheets (the first electromagnetic steel sheets 201) having the first magnet holding portions 31 between the permanent magnets 40 adjacent to each other in the magnet insertion holes 22, and the number C of the electromagnetic steel sheets (the first electromagnetic steel sheets 201 and the third electromagnetic steel sheets 203) having the second magnet holding portions 32 at the end portions of the magnet insertion holes 22 in the circumferential direction. Therefore, in addition to the effects described in the first embodiment, the demagnetization of the permanent magnets 40 due to the leakage magnetic flux between the permanent magnets 40 adjacent to each other in the magnet insertion holes 22 can be effectively suppressed.

In the above first and second embodiments, description has been made of the rotor core 20 including the first electromagnetic steel sheets 201 and the second electromagnetic steel sheets 202 (in the second embodiment, further the third electromagnetic steel sheets 203). However, other electromagnetic steel sheets may also be included additionally.

Figure 14:
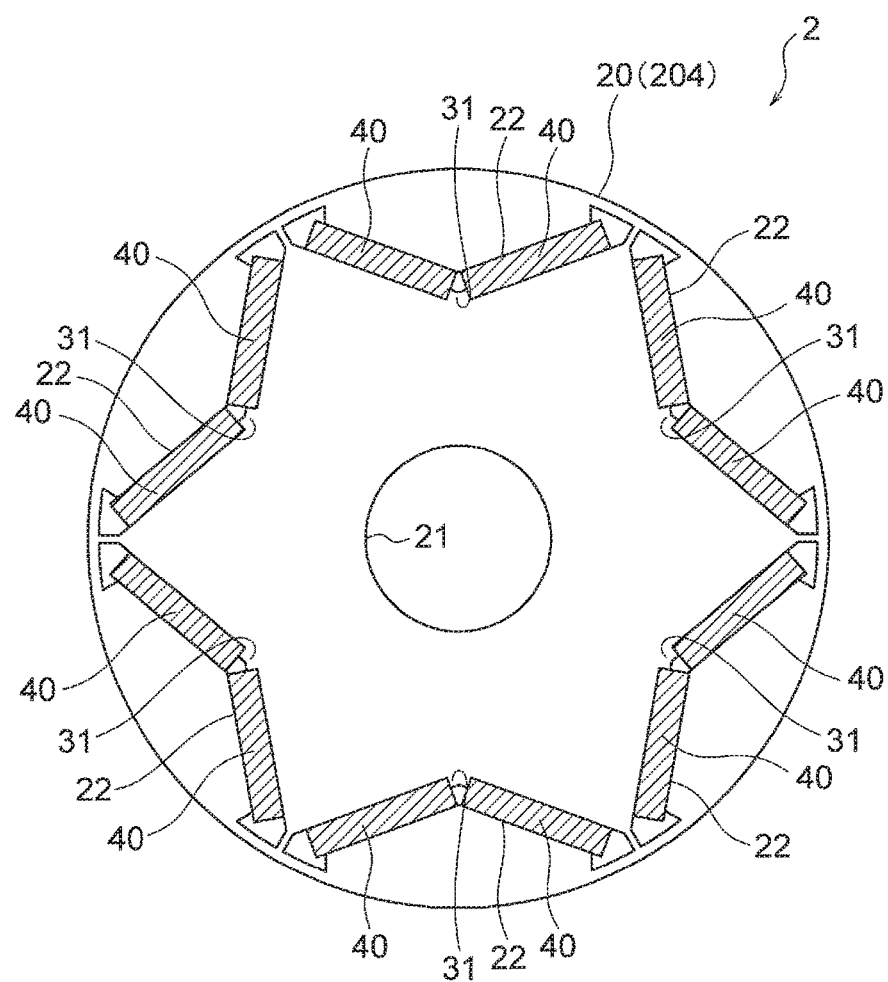
FIG. 14 is a sectional view of a rotor illustrating a fourth electromagnetic steel sheet of a modification in a planar view.
Figure 15:
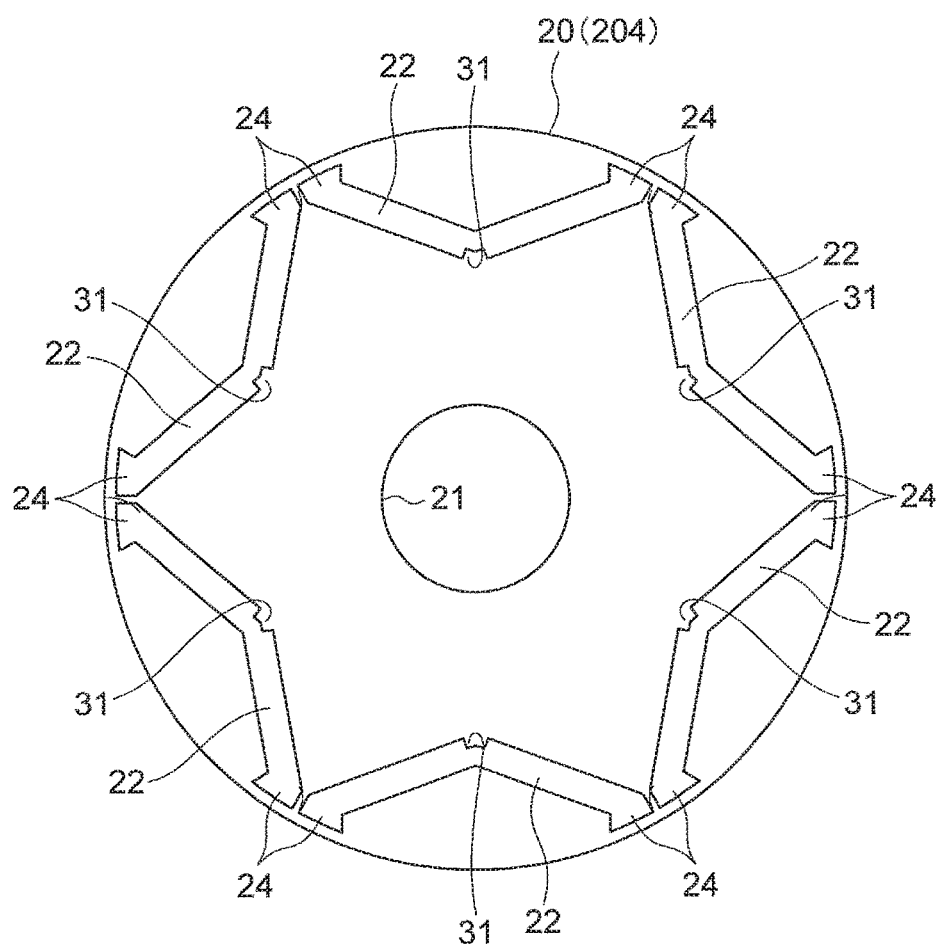
FIG. 15 is a sectional view of a rotor core illustrating the fourth electromagnetic steel sheet of the modification in a planar view.

FIG. 14 is a sectional view of the rotor 2 illustrating a fourth electromagnetic steel sheet 204 of a modification of the first and second embodiments in a planar view. FIG. 15 is a sectional view of the rotor core 20 illustrating the fourth electromagnetic steel sheet 204 in a planar view.

The fourth electromagnetic steel sheet 204 has a plurality of (here, six) magnet insertion holes 22, as is the case with the first electromagnetic steel sheet 201. The magnet insertion hole 22 has a V-shapes such that the center portion in the circumferential direction protrudes radially inward, and two permanent magnets 40 are disposed in each magnet insertion hole 22. In this regard, the fourth electromagnetic steel sheet 204 has the first magnet holding portion 31 at the center portion of the magnet insertion hole 22 in the circumferential direction, but has no second magnet holding portion 32 at the end portions of the magnet insertion hole 22 in the circumferential direction.

The fourth electromagnetic steel sheet 204 has the first magnet holding portion 31 at the center portion of the magnet insertion hole 22 in the circumferential direction, and thus has a smaller effect of suppressing the demagnetization of the permanent magnets 40 than the third electromagnetic steel sheet 203 (FIGS. 10 to 11), but has a function to position the permanent magnets 40 at the center portion of the magnet insertion hole 22 in the circumferential direction. Therefore, for example, if the fourth electromagnetic steel sheets 204 are used in part of the rotor core 20 of the second embodiment in the direction of the rotation axis, the first magnet holding portions 31 serve as guides for the permanent magnets 40, and thus the insertion of the permanent magnets 40 into the magnet insertion holes 22 is facilitated.

Figure 16:
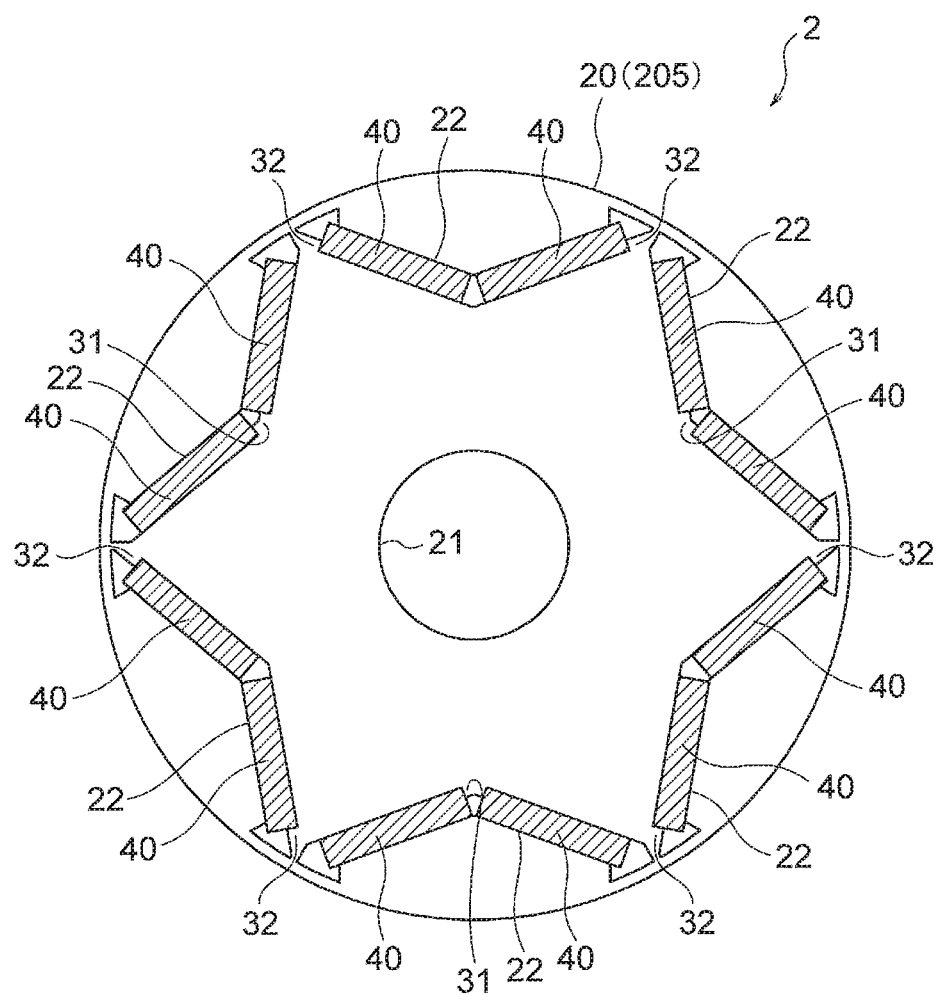
FIG. 16 is a sectional view of a rotor illustrating a fifth electromagnetic steel sheet of another modification in a planar view.
Figure 17:
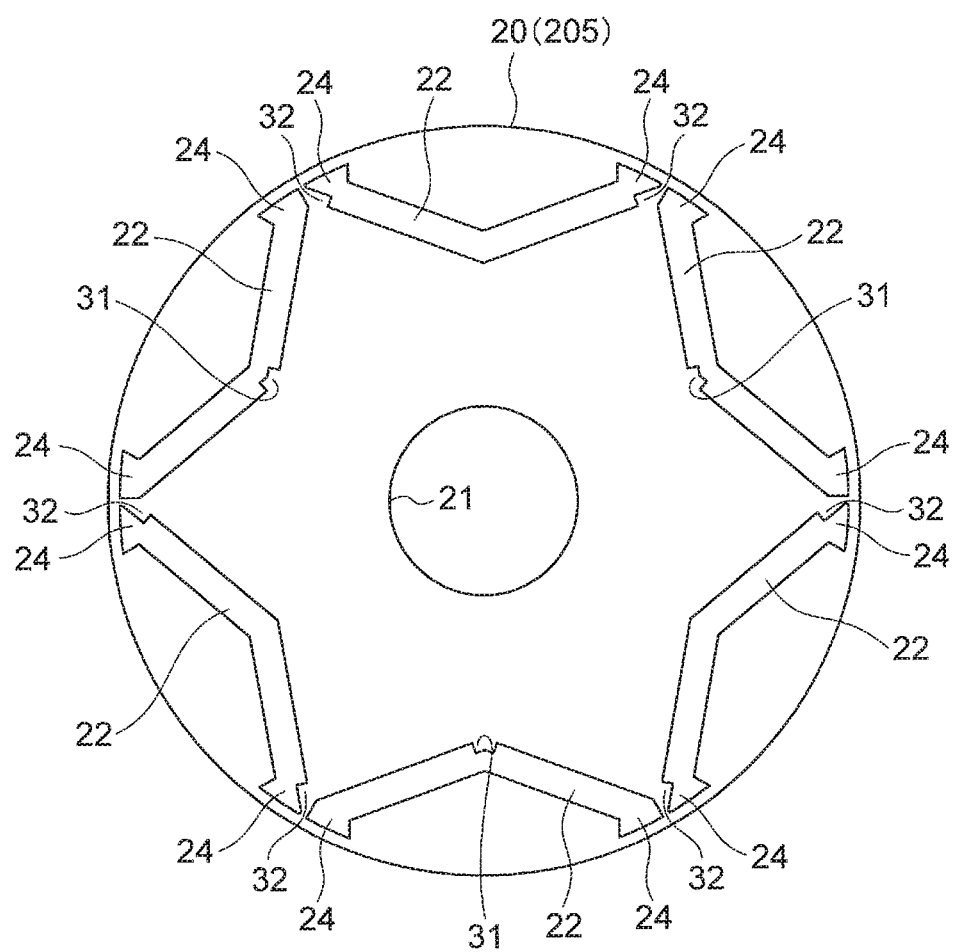
FIG. 17 is a sectional view of a rotor core illustrating the fifth electromagnetic steel sheet of the other modification in a planar view.

FIG. 16 is a sectional view of the rotor 2 illustrating a fifth electromagnetic steel sheet 205 in another modification in a planar view. FIG. 17 is a sectional view of the rotor core 20 illustrating the fifth electromagnetic steel sheet 205 in a planar view.

The fifth electromagnetic steel sheet 205 has a plurality of (here, six) magnet insertion holes 22, as is the case with the first electromagnetic steel sheet 201. The magnet insertion hole 22 has a V-shape such that the center portion in the circumferential direction protrudes radially inward, and two permanent magnets 40 are disposed in each magnet insertion hole 22.

In this regard, the fifth electromagnetic steel sheet 205 has both of regions where the first magnet holding portions 31 are disposed at the center portions of the magnet insertion holes 22 in the circumferential direction and the second magnet holding portions 32 are not disposed at the end portions of the magnet insertion holes 22 in the circumferential direction, and regions where the second magnet holding portions 32 are disposed at the end portions of the magnet insertion holes 22 in the circumferential direction and the first magnet holding portions 31 are not disposed at the center portions of the magnet insertion holes 22 in the circumferential direction. Here, the regions where the first magnet holding portions 31 are disposed at the center portions of the magnet insertion holes 22 in the circumferential direction and the regions where the second magnet holding portions 32 are disposed at the end portions of the magnet insertion holes 22 in the circumferential direction are alternatingly arranged in the circumferential direction of the rotor core 20. This fifth electromagnetic steel sheet 205 may be added to the rotor core 20 of the first or second embodiment.

Third Embodiment

Next, a third embodiment of the present invention will be described. The third embodiment is intended to position the permanent magnets 40 in magnet insertion holes 25 and to suppress the demagnetization of the permanent magnets 40 in a rotor 2A having the permanent magnets 40 in straight magnet insertion hole 25.

Figure 18:
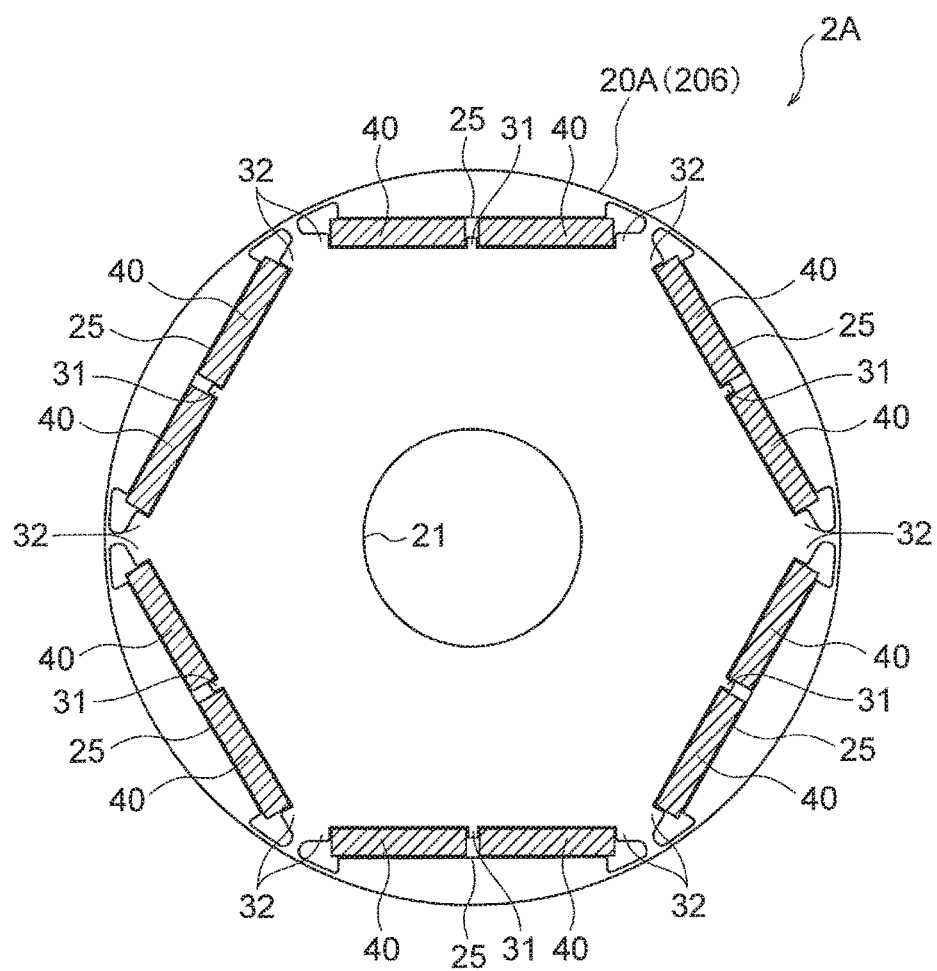
FIG. 18 is a sectional view of a rotor illustrating a first electromagnetic steel sheet of a third embodiment in a planar view.
Figure 19:
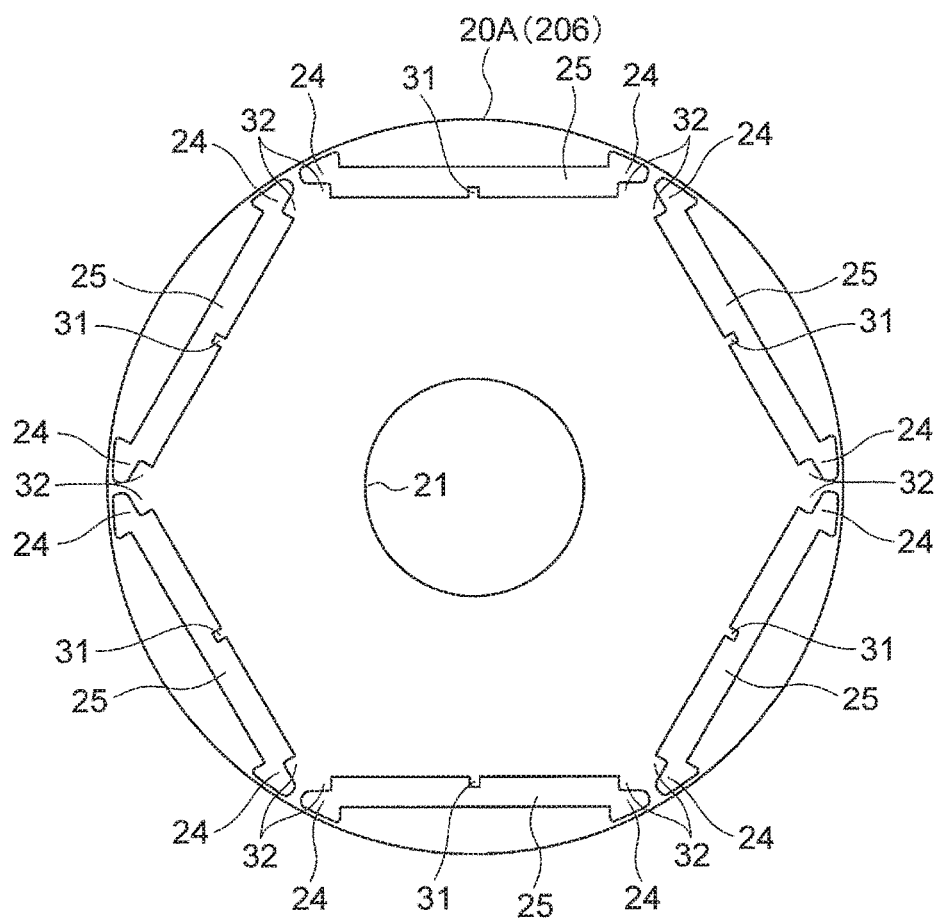
FIG. 19 is a sectional view of a rotor core illustrating the first electromagnetic steel sheet of the third embodiment in a planar view.
Figure 20:
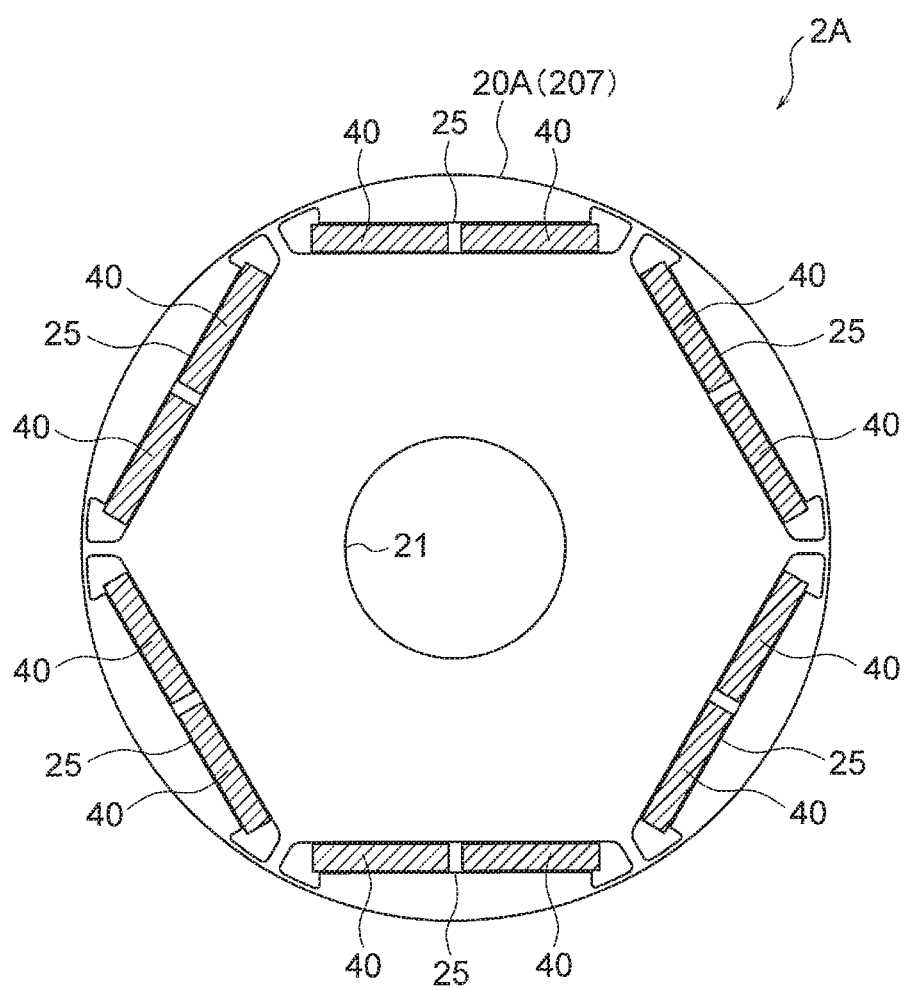
FIG. 20 is a sectional view of a rotor illustrating a second electromagnetic steel sheet of the third embodiment in a planar view.
Figure 21:
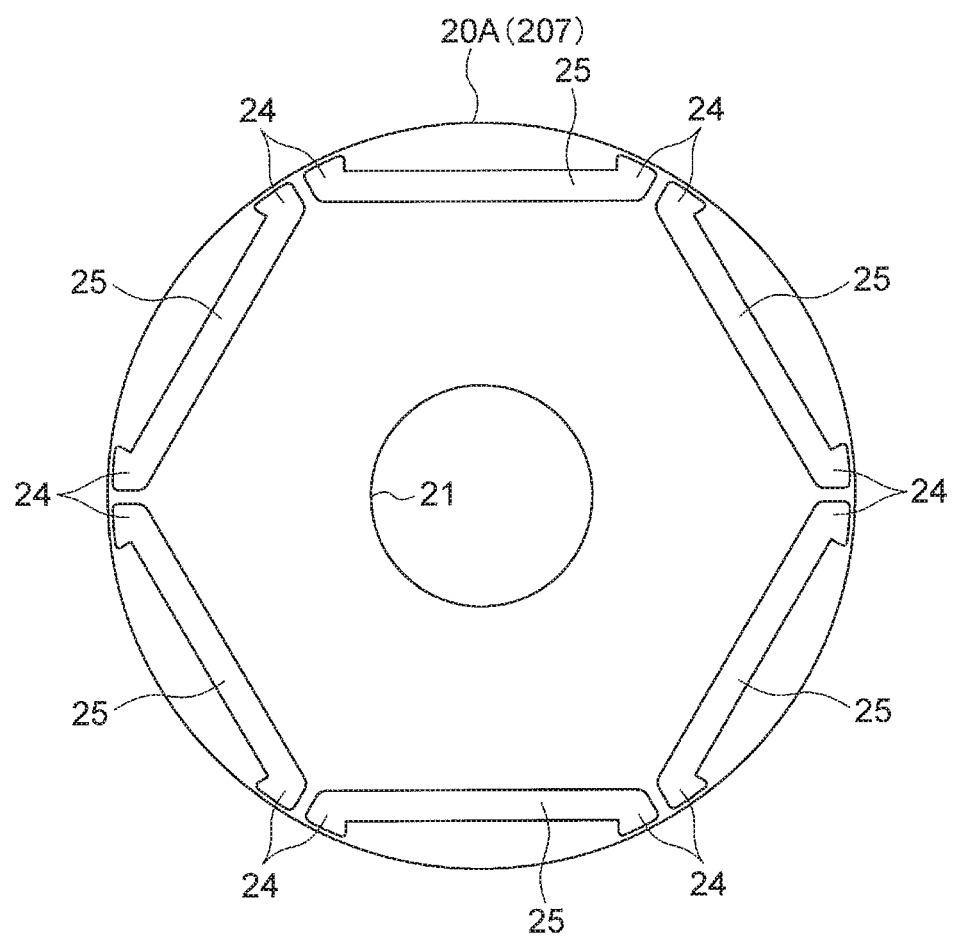
FIG. 21 is a sectional view of a rotor core illustrating the second electromagnetic steel sheet of the third embodiment in a planar view.

A rotor core 20A of the rotor 2A of the third embodiment includes first electromagnetic steel sheets 206 (FIGS. 18 to 19) and second electromagnetic steel sheets 207 (FIGS. 20 to 21). FIG. 18 is a sectional view of the rotor 2A illustrating the first electromagnetic steel sheet 206 in a planar view. FIG. 19 is a sectional view of the rotor core 20A illustrating the first electromagnetic steel sheet 206 in a planar view.

The first electromagnetic steel sheet 206 has a plurality of (here, six) magnet insertion holes 25. The magnet insertion hole 25 differs from the V-shaped magnet insertion hole 22 of the first embodiment in that the magnet insertion hole 25 extends straight along an outer circumference of the rotor core 20A. Each magnet insertion hole 25 corresponds to one magnetic pole. An extending direction of the magnet insertion hole 25 is perpendicular to a radial direction of the rotor core 20A at a center of the magnetic pole. Two permanent magnets 40 are disposed in each magnet insertion hole 25.

The first electromagnetic steel sheet 206 has the first magnet holding portion 31 at the center portion of the magnet insertion hole 25 in the circumferential direction, and has the second magnet holding portions 32 at the end portions of the magnet insertion hole 25 in the circumferential direction. In addition, the flux barriers 24 are formed on both sides of the magnet insertion hole 25 in the circumferential direction. Configurations of the magnet holding portions 31 and 32 and the flux barriers 24 are as described in the first embodiment.

FIG. 20 is a sectional view of the rotor 2A illustrating the second electromagnetic steel sheet 207 in a planar view. FIG. 21 is a sectional view of the rotor core 20A illustrating the second electromagnetic steel sheet 207 in a planar view.

The second electromagnetic steel sheet 207 has a plurality of (here, six) magnet insertion holes 25, as is the case with the first electromagnetic steel sheet 206. The magnet insertion hole 25 extends straight, and two permanent magnets 40 are disposed in each magnet insertion hole 25. In this regard, the magnet holding portions 31 and 32 are not provided in the magnet insertion hole 25 of the second electromagnetic steel sheet 207.

The first electromagnetic steel sheets 206 and the second electromagnetic steel sheets 207 can be stacked in a similar manner to the first electromagnetic steel sheets 201 and the second electromagnetic steel sheets 202 described in the first embodiment. For example, as described with reference to FIG. 6, the first electromagnetic steel sheets 206 can be stacked at both end portions and the center portion (a third stage) of the rotor core 20A in the direction of the rotation axis, and the second electromagnetic steel sheets 207 can be stacked at a second stage and a fourth stage of the rotor core 20A.

Incidentally, the stacked structure of the first electromagnetic steel sheets 206 and the second electromagnetic steel sheets 207 is not limited to the stacked structure described with reference to FIG. 6, but may be the stacked structure described with reference to FIG. 7, for example. Moreover, as described in the second embodiment, it is also possible to further add the electromagnetic steel sheets having the second magnet holding portions 32 at the end portions of the magnet insertion hole 25 in the circumferential direction and having no first magnet holding portion 31 at the center portion of the magnet insertion hole 25 in the circumferential direction.

The first electromagnetic steel sheet 206 of the rotor core 20A has the magnet holding portions 31 and 32 in the magnet insertion holes 25, and therefore can position the permanent magnets 40 in the magnet insertion holes 25. Moreover, the second electromagnetic steel sheet 207 of the rotor core 20A has none of the magnet holding portions 31 and 32 in the magnet insertion holes 25, and therefore can suppress the demagnetization of the permanent magnets 40 due to the magnetic flux flowing into the permanent magnets 40 from the magnet holding portions 31 and 32.

Incidentally, the motor of the third embodiment is configured in a similar manner to the motor 100 described in the first embodiment except for the configuration of the rotor core 20A. Moreover, the motor of the third embodiment can be used in the rotary compressor 300 (FIG. 8) and the refrigeration and air conditioning apparatus 400 (FIG. 9) described in the first embodiment.

As described above, according to the third embodiment of the present invention, the permanent magnets 40 can be positioned in the magnet insertion holes 25 and the demagnetization of the permanent magnets 40 can be suppressed, even in a configuration in which the rotor core 20A has the straight magnet insertion holes 25.

Fourth Embodiment

Next, a fourth embodiment of the present invention will be described. The fourth embodiment is intended to position permanent magnets 40 in magnet insertion holes 26 and to suppress the demagnetization of the permanent magnets 40 in a rotor 2B in which three permanent magnets 40 are disposed in each magnet insertion hole 26.

Figure 22:
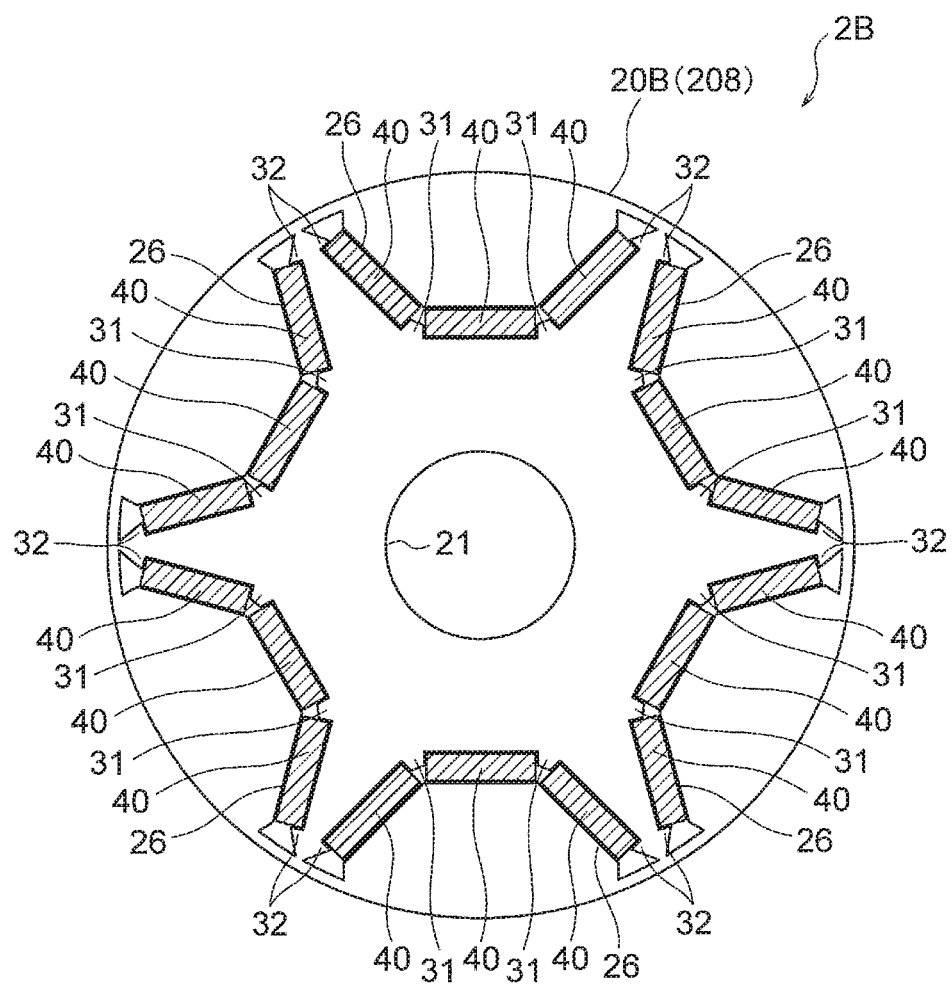
FIG. 22 is a sectional view of a rotor illustrating a first electromagnetic steel sheet of a fourth embodiment in a planar view.
Figure 23:
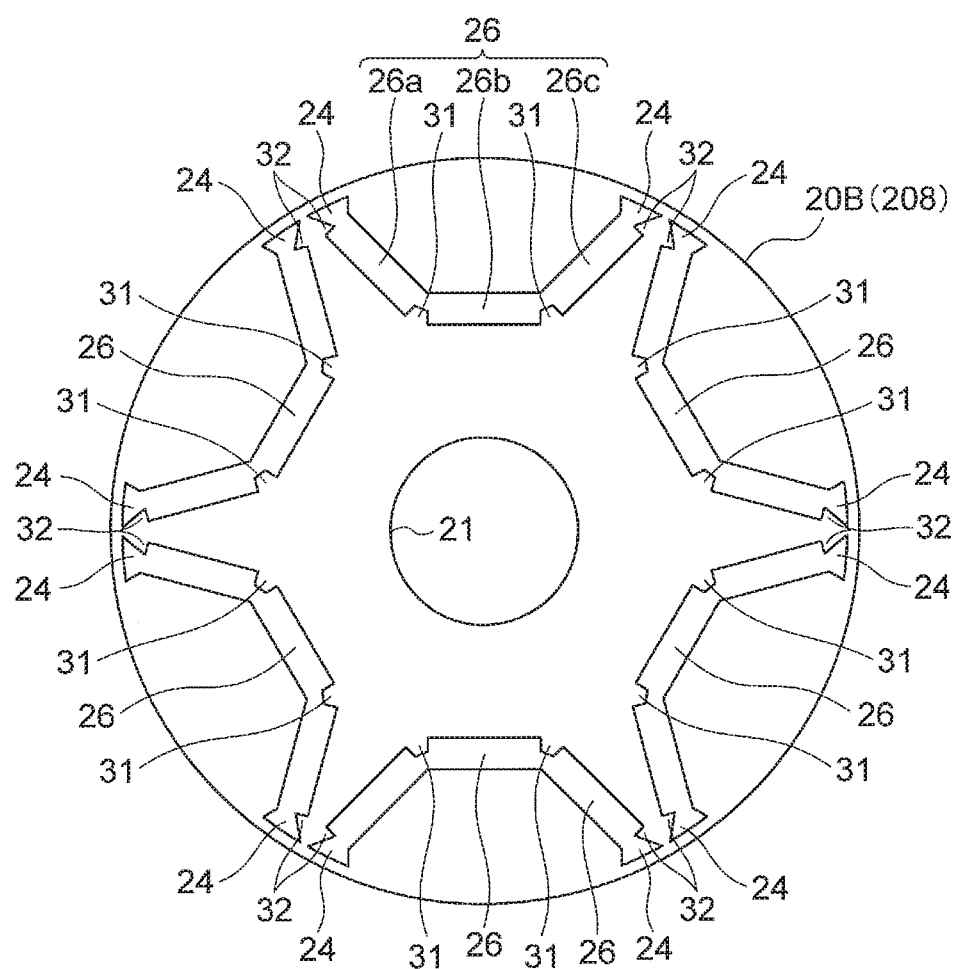
FIG. 23 is a sectional view of a rotor core illustrating the first electromagnetic steel sheet of the fourth embodiment in a planar view.
Figure 24:
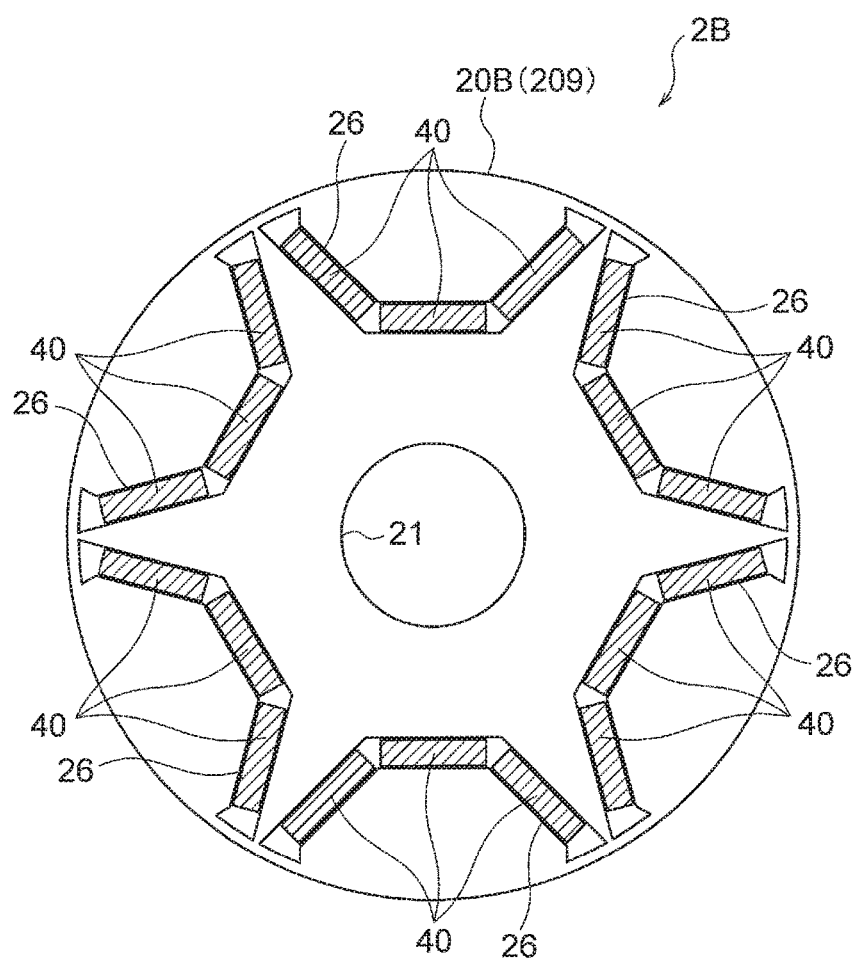
FIG. 24 is a sectional view of a rotor illustrating a second electromagnetic steel sheet of the fourth embodiment in a planar view.
Figure 25:
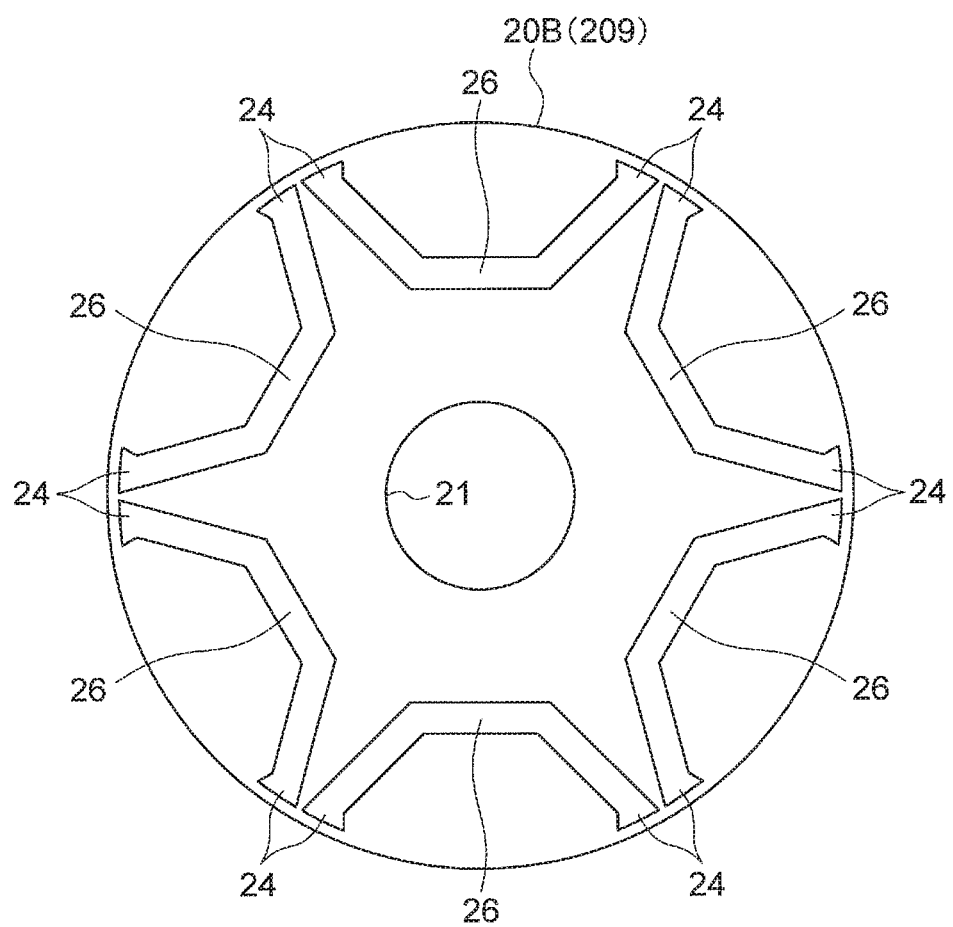
FIG. 25 is a sectional view of a rotor core illustrating the second electromagnetic steel sheet of the fourth embodiment in a planar view.

A rotor core 20B of the rotor 2B of the fourth embodiment has first electromagnetic steel sheets 208 (FIGS. 22 to 23) and second electromagnetic steel sheets 209 (FIGS. 24 to 25). FIG. 22 is a sectional view of the rotor 2 illustrating the first electromagnetic steel sheet 208 in a planar view. FIG. 23 is a sectional view of the rotor core 20B illustrating the first electromagnetic steel sheet 208 in a planar view.

The first electromagnetic steel sheet 208 has a plurality of (here, six) magnet insertion holes 26. Each magnet insertion hole 26 corresponds to one magnetic pole. Three permanent magnets 40 are disposed in each magnet insertion hole 26. That is, three permanent magnets 40 are disposed corresponding to each magnetic pole. Here, the rotor 2B has six poles as described above, and therefore eighteen permanent magnets 40 in total are disposed.

As illustrated in FIG. 23, the magnet insertion hole 26 has a first section 26a, a second section 26b, and a third section 26c along an outer circumference of the rotor core 20B. The permanent magnet 40 is inserted in each of these three sections 26a, 26b and 26c.

Of the first section 26a, the second section 26b, and the third section 26c of the magnet insertion hole 26, the second section 26b located at a center portion in the circumferential direction is also located at the radially innermost side, and extends straight in the circumferential direction. The first section 26a and the third section 26c extend radially outward from both end portions of the second section 26b. An interval between the first section 26a and the third section 26c becomes wider toward the outer circumference of the rotor core 20B. This shape of the magnet insertion hole 26 is also referred to as a bathtub shape.

The first electromagnetic steel sheet 208 has the first magnet holding portion 31 at the center portion of the magnet insertion hole 26 in the circumferential direction, and has the second magnet holding portions 32 at the end portions of the magnet insertion hole 26 in the circumferential direction. In addition, the flux barriers 24 are formed on both sides of the magnet insertion hole 26 in the circumferential direction. Configurations of the magnet holding portions 31 and 32 and the flux barriers 24 are as described in the first embodiment.

FIG. 24 is a sectional view of the rotor 2B illustrating the second electromagnetic steel sheet 209 of the fourth embodiment in a planar view. FIG. 25 is the sectional view of the rotor core 20B illustrating the second electromagnetic steel sheet 209 in a planar view.

The second electromagnetic steel sheet 209 has a plurality of (here, six) magnet insertion holes 26, as is the case with the first electromagnetic steel sheet 208. The magnet insertion holes 26 have bathtub shapes, and three permanent magnets 40 are disposed in each magnet insertion hole 26. However, as illustrated in FIG. 25, the magnet holding portions 31 and 32 are not provided in the magnet insertion holes 26 of the second electromagnetic steel sheet 209.

The first electromagnetic steel sheets 208 and the second electromagnetic steel sheets 209 can be stacked in a similar manner to the first electromagnetic steel sheets 201 and the second electromagnetic steel sheets 202 described in the first embodiment. For example, as described with reference to FIG. 6, the first electromagnetic steel sheets 208 can be stacked at both end portions and the center portion (a third stage) of the rotor core 20B in the direction of the rotation axis, and the second electromagnetic steel sheets 209 can be stacked at a second stage and a fourth stage of the rotor core 20B in the direction of the rotation axis.

Incidentally, the stacked structure of the first electromagnetic steel sheets 208 and the second electromagnetic steel sheets 209 is not limited to the stacked structure described with reference to FIG. 6, but may be the stacked structure described with reference to FIG. 7, for example. Moreover, as described in the second embodiment, it is also possible to further add the electromagnetic steel sheets having the second magnet holding portions 32 at the end portions of the magnet insertion hole in the circumferential direction and having no first magnet holding portion 31 at the center portion of the magnet insertion hole 26 in the circumferential direction.

The first electromagnetic steel sheets 208 of the rotor core 20B have the magnet holding portions 31 and 32 in the magnet insertion holes 26, and thus can position the permanent magnets 40 in the magnet insertion holes 26. Moreover, the second electromagnetic steel sheets 209 of the rotor core 20B do not have the magnet holding portions 31 and 32 in the magnet insertion holes 26, and thus can suppress the demagnetization of the permanent magnets 40 due to the magnetic flux passing through the magnet holding portions 31 and 32.

Incidentally, the motor of the fourth embodiment is configured in a similar manner to the motor 100 described in the first embodiment, except for the configuration of the rotor core 20B. Moreover, the motor of the fourth embodiment can be used in the rotary compressor 300 (FIG. 8) and the refrigeration and air conditioning apparatus 400 (FIG. 9) described in the first embodiment.

As described above, according to the fourth embodiment of the present invention, the permanent magnets 40 can be positioned in the magnet insertion holes 26 and the demagnetization of the permanent magnets 40 can be suppressed, even in a configuration in which the rotor core 20B has the magnet insertion holes 26 of the bathtub shapes and three permanent magnets 40 are disposed in each magnet insertion holes 26.

Fifth Embodiment

Next, a fifth embodiment of the present invention will be described. The fifth embodiment is intended to further enhance the effect of suppressing the demagnetization of permanent magnets 40 by providing openings 28 on radially inner sides of the magnet insertion holes 22 of the rotor core 20.

Figure 26:
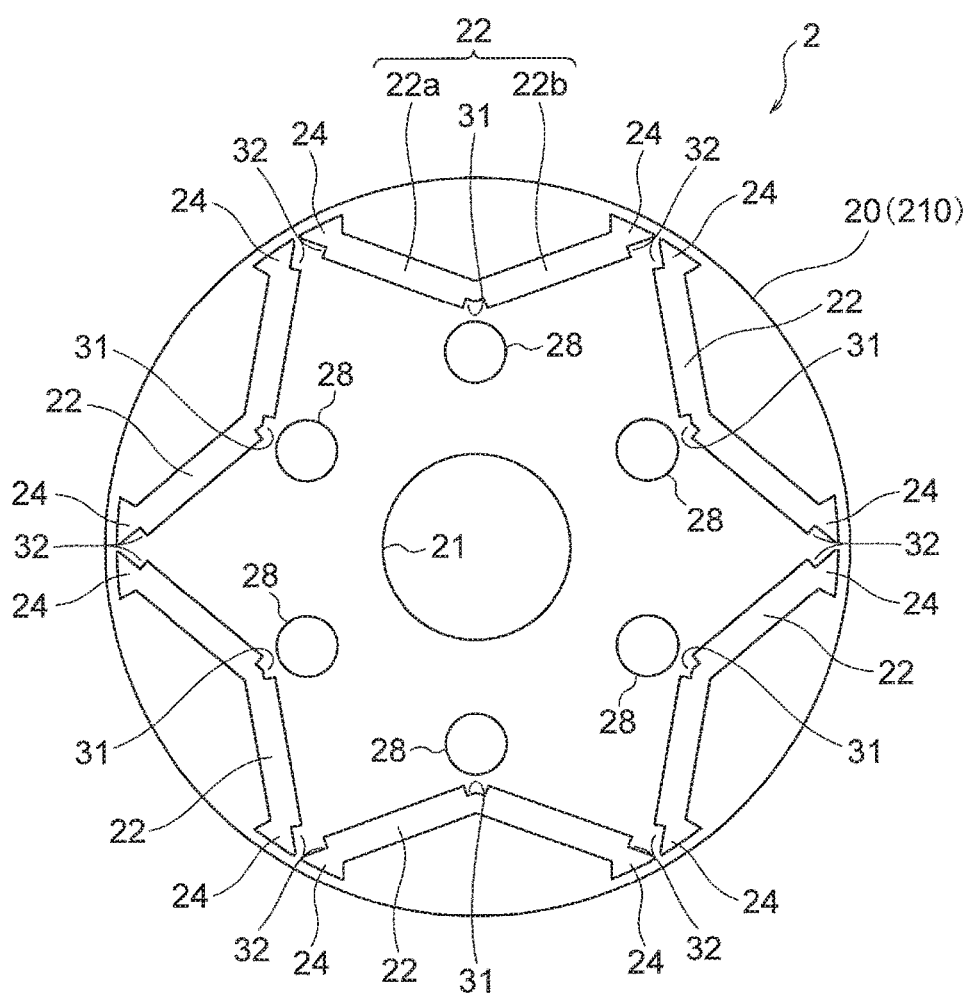
FIG. 26 is a sectional view of a rotor core illustrating a first electromagnetic steel sheet of a fifth embodiment.
Figure 27:
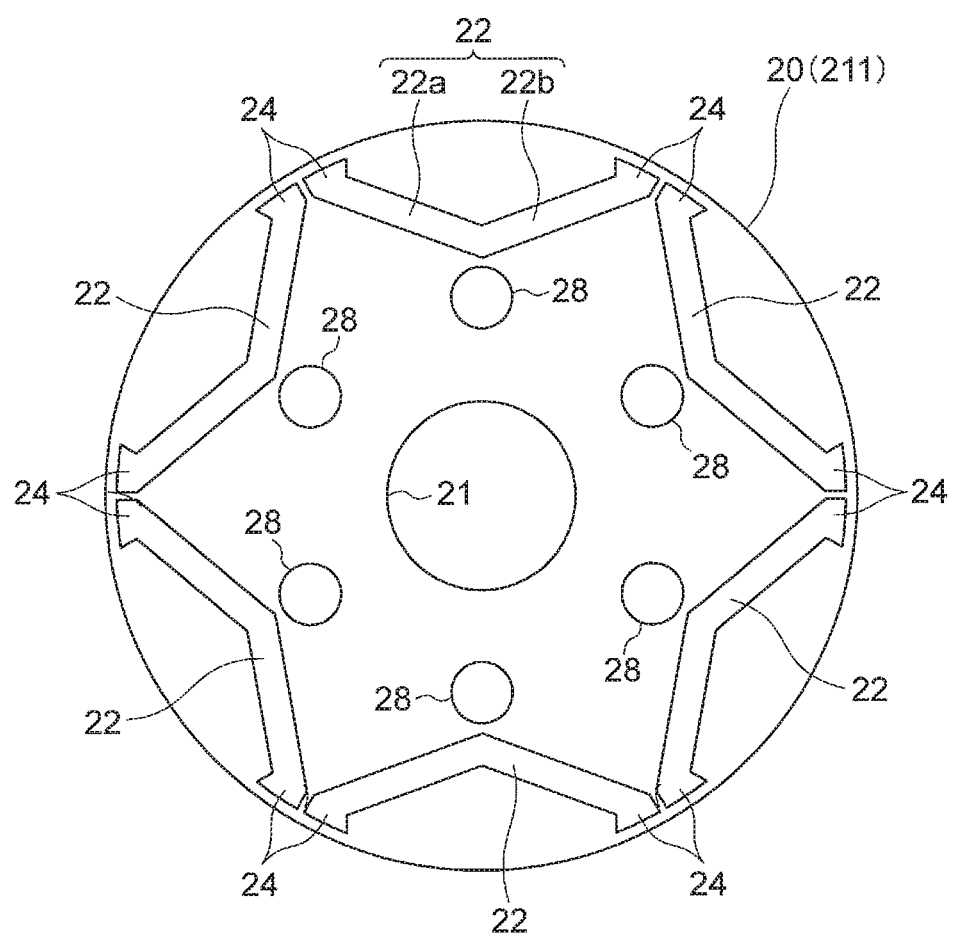
FIG. 27 is a sectional view of a rotor core illustrating a second electromagnetic steel sheet of the fifth embodiment.

The rotor core 20 of the fifth embodiment is obtained by adding the openings 28 on the radially inner sides of the magnet insertion holes 22 to the first electromagnetic steel sheets 201 and the second electromagnetic steel sheets 202 described in the first embodiment. FIG. 26 is a sectional view of the rotor core 20 illustrating a first electromagnetic steel sheet 210 of the fifth embodiment in a planar view. FIG. 27 is a sectional view of the rotor core 20 illustrating a second electromagnetic steel sheet 211 in a planar view.

The first electromagnetic steel sheet 210 of the fifth embodiment is configured in a similar manner to the above first electromagnetic steel sheet 201 (FIGS. 2 to 3), but has the openings 28 on the radially inner sides of the first magnet holding portions 31 at the center portions of the magnet insertion holes 22 in the circumferential direction.

Moreover, the second electromagnetic steel sheet 211 of the fifth embodiment is configured in a similar manner to the above described second electromagnetic steel sheet 202 (FIGS. 4 to 5), but has the openings 28 on the radially inner sides of the center portions of the magnet insertion holes 22 in the circumferential direction.

The openings 28 are provided to penetrate the rotor core 20 in the direction of the rotation axis. With the opening 28, the magnetic resistance through the first magnet holding portion 31 increases, and the magnetic flux from the coil 15 of the stator 1 is less likely to flow through the first magnet holding portion 31.

By disposing the openings 28 in this way, the demagnetization of the permanent magnets 40 due to the magnetic flux flowing into the permanent magnets 40 from the first magnet holding portions 31 can be suppressed. Moreover, for example, the openings 28 have a function to cause the refrigerant of the rotary compressor 300 (FIG. 8) to pass therethrough in the direction of the rotation axis and cool the rotor core 20 and the permanent magnets 40.

It is desirable that the openings 28 are as close to the magnet insertion holes 22 as possible. This is because, as the openings 28 are closer to the magnet insertion holes 22, the magnetic resistances through the first magnet holding portions 31 become higher. Here, the distance from the opening 28 to the magnet insertion hole 22 is set shorter than the distance from the opening 28 to the shaft hole 21. The minimum value of the distance from the opening 28 to the magnet insertion hole 22 is the same as a thickness (for example, 0.35 mm) of the electromagnetic steel sheet as an element the rotor core 20, and the maximum value of the distance is 3 mm.

The stacked structure of the first electromagnetic steel sheets 210 and the second electromagnetic steel sheets 211 is as described with reference to FIG. 6 or FIG. 7 in the first embodiment. Moreover, it is also possible to use the third electromagnetic steel sheets 203 described in the second embodiment to which the openings 28 are added.

The motor of the fifth embodiment is configured in a similar manner to the motor 100 described in the first embodiment, except for the configuration of the rotor core 20. Moreover, the motor of the fifth embodiment can be used in the rotary compressor 300 (FIG. 8) and the refrigeration and air conditioning apparatus 400 (FIG. 9) described in the first embodiment.

As described above, according to the fifth embodiment of the present invention, the openings 28 are disposed on the radially inner sides of the magnet holding portions 31 at the center portions of the magnet insertion holes 22 in the circumferential direction, the distance from the opening 28 to the magnet insertion holes 22 is set to be shorter than the distance from the opening 28 to the shaft hole 21. Therefore, the magnetic resistances through the first magnet holding portions 31 can be increased, and the effect of suppressing the demagnetization of the permanent magnets 40 can be enhanced, in addition to the effects described in the first embodiment.

Incidentally, it is also possible to add the openings 28 described in the fifth embodiment to the rotor core 20 described in the above described third embodiment and fourth embodiment.

Although the preferred embodiments of the present invention have been described specifically, the present invention is not limited to the above described embodiments, but may be improved or modified variously within a range not departing from the spirit of the present invention.

For example, in each of the above described embodiments, the rotor 2 (2A, 2B) has six magnet insertion holes 22 (25, 26), but the number of magnet insertion holes can be changed as appropriate according to the number of magnetic poles of the rotor 2 (2A, 2B). Moreover, in each of the above embodiments, the number of permanent magnets 40 disposed in each magnet insertion hole 22 (25, 26) is two or three, but four or more permanent magnets 40 may be disposed in each magnet insertion hole 22.

Moreover, the compressor using the motor 100 of each of the above described embodiments is not limited to the rotary compressor 300 described with reference to FIG. 8, but may be a compressor of any other type. Moreover, the refrigeration and air conditioning apparatus using the motor 100 is not limited to the refrigeration and air conditioning apparatus 400 described with reference to FIG. 9.

What is claimed is:

1. A motor comprising a stator and a rotor provided inside the stator, the rotor comprising:
   a rotor core having a magnet insertion hole, and
   a plurality of permanent magnets disposed in the magnet insertion hole of the rotor core and having two permanent magnets adjacent to each other,
   wherein the rotor core has a first magnet holding portion disposed between the two permanent magnets adjacent to each other in the magnet insertion hole, and a second magnet holding portion disposed at an end of the magnet insertion hole in a circumferential direction of the rotor core;
   wherein the rotor core has a plurality of electromagnetic steel sheets stacked in an axial direction, and
   wherein relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

2. The motor according to claim 1, wherein each of the first magnet holding portion and the second magnet holding portion is a protrusion formed in the magnet insertion hole.

3. The motor according to claim 1, wherein the first magnet holding portion and the second magnet holding portion are disposed on an inner side of the magnet insertion hole in a radial direction of the rotor core.

4. The motor according to claim 1, wherein a relationship B=C is further satisfied.

5. The motor according to claim 4, wherein the plurality of electromagnetic steel sheets of the rotor core comprises:
a first electromagnetic steel sheet having the first magnet holding portion and the second magnet holding portion, and
a second electromagnetic steel sheet having neither the first magnet holding portion nor the second magnet holding portion.

6. The motor according to claim 1, wherein a relationship C>B is further satisfied.

7. The motor according to claim 6, wherein the plurality of electromagnetic steel sheets of the rotor core comprises:
a first electromagnetic steel sheet having the first magnet holding portion and the second magnet holding portion;
a second electromagnetic steel sheet having neither the first magnet holding portion nor the second magnet holding portion, and
a third electromagnetic steel sheet having the second magnet holding portion but having no first magnet holding portion.

8. The motor according to claim 1, wherein the plurality of electromagnetic steel sheets of the rotor core comprises:
a first electromagnetic steel sheet having the first magnet holding portion and the second magnet holding portion;
a second electromagnetic steel sheet having neither the first magnet holding portion nor the second magnet holding portion;
a third electromagnetic steel sheet having the second magnet holding portion but having no first magnet holding portion, and
a fourth electromagnetic steel sheet having the first magnet holding portion but having no second magnet holding portion.

9. The motor according to claim 1, wherein, among the plurality of electromagnetic steel sheets of the rotor core, the electromagnetic steel sheet disposed at least one end of the rotor core in a stacking direction has at least one of the first magnet holding portion and the second magnet holding portion.

10. The motor according to claim 1, wherein each of the plurality of permanent magnets is a rare earth magnet containing neodymium (Nd), iron (Fe) and boron (B) as principal components, and
exhibits a residual magnetic flux density in a range from 1.27 T to 1.42 T at 20° C. and a coercivity in a range from 1671 kA/m to 1922 kA/m at 20° C.

11. The motor according to claim 1, wherein the magnet insertion hole has a V-shape such that a center portion of the magnet insertion hole in the circumferential direction protrudes inward in a radial direction of the rotor core.

12. The rotor according to claim 1, wherein the magnet insertion hole extends straight, and the plurality of the permanent magnets comprises two permanent magnets.

13. The motor according to claim 1, wherein the plurality of permanent magnets comprises three permanent magnets.

14. The motor according to claim 1, wherein the rotor core has an opening on an inner side of the first magnet holding portion in a radial direction;
wherein the rotor core has a center hole at a center in the radial direction, and
wherein a distance from the opening to the magnet insertion hole is shorter than a distance from the opening to the center hole.

15. A rotor comprising:
a rotor core having a magnet insertion hole, and
a plurality of permanent magnets disposed in the magnet insertion hole of the rotor core and having two permanent magnets adjacent to each other,
wherein the rotor core has a first magnet holding portion disposed between the two permanent magnets adjacent to each other in the magnet insertion hole, and a second magnet holding portion disposed at an end of the magnet insertion hole in a circumferential direction of the rotor core;
wherein the rotor core has a plurality of electromagnetic steel sheets stacked in an axial direction, and
wherein relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

16. A compressor comprising a motor and a compression mechanism driven by the motor,
the motor comprising a stator and a rotor provided inside the stator,
the rotor comprising:
a rotor core having a magnet insertion hole, and
a plurality of permanent magnets disposed in the magnet insertion hole of the rotor core and having two permanent magnets adjacent to each other,
wherein the rotor core has a first magnet holding portion disposed between the two permanent magnets adjacent to each other in the magnet insertion hole, and a second magnet holding portion disposed at an end of the magnet insertion hole in a circumferential direction of the rotor core;
wherein the rotor core has a plurality of electromagnetic steel sheets stacked in an axial direction, and
wherein relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

17. A refrigeration and air conditioning apparatus comprising a compressor, a condenser, a decompression device and an evaporator,
the compressor comprising a motor and a compression mechanism driven by the motor,
the motor comprising a stator and a rotor provided inside the stator,
the rotor comprising:
a rotor core having a magnet insertion hole, and a plurality of permanent magnets disposed in the magnet insertion hole of the rotor core and having two permanent magnets adjacent to each other, wherein the rotor core has a first magnet holding portion disposed between the two permanent magnets adjacent to each other in the magnet insertion hole, and a second magnet holding portion disposed at an end of the magnet insertion hole in a circumferential direction of the rotor core;

wherein the rotor core has a plurality of electromagnetic steel sheets stacked in an axial direction, and wherein relationships A>B and A>C are satisfied, where a number of the plurality of electromagnetic steel sheets of the rotor core is represented by A, and among the plurality of electromagnetic steel sheets of the rotor core, a number of electromagnetic steel sheets having the first magnet holding portions is represented by B, and a number of electromagnetic steel sheets having the second magnet holding portions is represented by C.

* * * * *